(12) United States Patent
Jenkins et al.

(10) Patent No.: US 11,766,151 B2
(45) Date of Patent: Sep. 26, 2023

(54) COOKING SYSTEM WITH ERROR DETECTION

(71) Applicant: Meyer Intellectual Properties Ltd., Kowloon (HK)

(72) Inventors: Jonathan A. Jenkins, Seattle, WA (US); Brenden Duncombe-Smith, Seattle, WA (US); Darren Erik Vengroff, Seattle, WA (US)

(73) Assignee: Meyer Intellectual Properties Ltd.

( * ) Notice: Subject to any disclaimer, the term of this patent is extended or adjusted under 35 U.S.C. 154(b) by 1247 days.

(21) Appl. No.: 15/965,118

(22) Filed: Apr. 27, 2018

(65) Prior Publication Data

US 2018/0242772 A1 Aug. 30, 2018

Related U.S. Application Data

(63) Continuation-in-part of application No. 15/434,695, filed on Feb. 16, 2017, now abandoned.
(Continued)

(51) Int. Cl.
*A47J 27/62* (2006.01)
*G08B 21/18* (2006.01)
(Continued)

(52) U.S. Cl.
CPC .............. *A47J 27/62* (2013.01); *A47J 36/321* (2018.08); *G08B 5/22* (2013.01); *G08B 21/182* (2013.01); *H04B 5/0043* (2013.01)

(58) Field of Classification Search
CPC ........ A47J 527/10; A47J 27/004; A47J 27/62; A47J 27/21016; A47J 27/16; A47J 527/04;
(Continued)

(56) References Cited

U.S. PATENT DOCUMENTS 3,742,178 A 6/1973 Harnden, Jr.
4,381,438 A 4/1983 Goessler et al.
(Continued)

FOREIGN PATENT DOCUMENTS

AU 2017220002 7/2019
CA 3016142 8/2017
(Continued)

OTHER PUBLICATIONS

Examiner's Report dated Dec. 12, 2018 issued in connection with corresponding Australian Application No. 2017220032.
(Continued)

*Primary Examiner* — Dana Ross
*Assistant Examiner* — Kuangyue Chen
(74) *Attorney, Agent, or Firm* — Akerman LLP

(57) ABSTRACT

According to one example, a system comprises a plurality of cooking device systems that are each operable to be used in cooking a food item during a cooking process; a heat source system comprising a plurality of heat sources that are each operable to provide an amount of energy to be used to cook the food item; and a sensor operable to detect information associated with the cooking process. The system further comprises a processor operable to determine an identity of a first cooking device system and determine an identity of a first heat source. The processor is further operable to receive an indication of the detected information; determine whether there is an error in the cooking process based on the indication; and following a determination that there is an error in the cooking process, transmit an indication of the error in the cooking process.

14 Claims, 11 Drawing Sheets

Related U.S. Application Data

(60) Provisional application No. 62/302,018, filed on Mar. 1, 2016, provisional application No. 62/297,134, filed on Feb. 18, 2016.

(51) Int. Cl.
*H04B 5/00* (2006.01)
*G08B 5/22* (2006.01)
*A47J 36/32* (2006.01)

(58) Field of Classification Search
CPC ...... A47J 2027/043; A47J 27/09; A47J 43/00; A47J 37/00
See application file for complete search history.

(56) References Cited

U.S. PATENT DOCUMENTS

| | | |
|---|---|---|
| 5,441,344 A | 8/1995 | Cook, III |
| 5,746,114 A | 5/1998 | Harris |
| 5,951,900 A | 9/1999 | Smrke |
| 6,170,509 B1 | 1/2001 | Karta |
| 6,206,564 B1 | 3/2001 | Adamczewski |
| 6,462,316 B1 | 10/2002 | Berkcan et al. |
| 6,578,469 B2 | 6/2003 | Sharpe |
| 6,591,739 B2 | 7/2003 | Norcross |
| 6,630,650 B2 | 10/2003 | Bassill et al. |
| 6,795,421 B1 | 9/2004 | Heinonen et al. |
| 7,156,367 B1 | 1/2007 | Huang et al. |
| 7,409,765 B2 | 8/2008 | So |
| 7,602,754 B2 | 10/2009 | Heinonen et al. |
| 8,588,688 B2 | 11/2013 | Reunamaki et al. |
| 8,692,162 B2 | 4/2014 | Elston et al. |
| 8,737,917 B2 | 5/2014 | Desai et al. |
| 8,800,542 B1 | 8/2014 | Kennington |
| 8,817,717 B2 | 8/2014 | Ly-Gagnon et al. |
| 8,976,158 B2 | 3/2015 | Eriksson et al. |
| 8,992,225 B2 | 3/2015 | Do |
| 9,185,652 B2 | 11/2015 | Xie et al. |
| 9,258,695 B2 | 2/2016 | Kasslin et al. |
| 9,357,342 B2 | 5/2016 | Viswanadham et al. |
| 9,414,217 B2 | 8/2016 | Knaappila |
| 9,439,530 B2 | 9/2016 | Logan |
| 9,456,295 B2 | 9/2016 | Choi et al. |
| 9,538,356 B2 | 1/2017 | Hughes et al. |
| 9,544,755 B2 | 1/2017 | Palin et al. |
| 9,702,858 B1 | 7/2017 | Minvielle |
| 9,979,724 B2 | 5/2018 | Tunnell |
| 10,085,584 B2 | 10/2018 | Johncock et al. |
| 2003/0028688 A1 | 2/2003 | Tiphane et al. |
| 2003/0037681 A1 | 2/2003 | Zhu et al. |
| 2004/0016348 A1 | 1/2004 | Sharpe |
| 2004/0041714 A1* | 3/2004 | Forster ............... G06K 19/0723 |
| | | 340/870.17 |
| 2004/0221046 A1 | 11/2004 | Heinonen et al. |
| 2006/0016800 A1 | 1/2006 | Paradiso et al. |
| 2006/0234177 A1 | 10/2006 | Yu et al. |
| 2007/0221668 A1 | 9/2007 | Baarman |
| 2008/0055241 A1 | 3/2008 | Goldenberg |
| 2009/0293166 A1 | 12/2009 | Shayne |
| 2010/0156645 A1 | 6/2010 | Beck |
| 2010/0187224 A1 | 7/2010 | Hyde |
| 2011/0021142 A1 | 1/2011 | Desai et al. |
| 2011/0044370 A1 | 2/2011 | Schochet |
| 2011/0148773 A1 | 6/2011 | Rudolph |
| 2011/0253693 A1 | 10/2011 | Lyons et al. |
| 2012/0000903 A1 | 1/2012 | Baarman et al. |
| 2012/0111852 A1 | 5/2012 | Bach |
| 2012/0175539 A1 | 7/2012 | Nebbia et al. |
| 2012/0186459 A1 | 7/2012 | Tisselli et al. |
| 2012/0190302 A1 | 7/2012 | Reunamaki et al. |
| 2012/0281638 A1 | 11/2012 | Ly-Gagnon et al. |
| 2013/0003490 A1 | 1/2013 | Kemker et al. |
| 2013/0003630 A1 | 1/2013 | Xhafa et al. |
| 2013/0112683 A1 | 5/2013 | Hegedis et al. |
| 2013/0165044 A1 | 6/2013 | Xie et al. |
| 2013/0171304 A1 | 7/2013 | Huntley |
| 2014/0033928 A1 | 2/2014 | Broders |
| 2014/0039650 A1 | 2/2014 | Baraille et al. |
| 2014/0113039 A1 | 4/2014 | Barkhouse |
| 2014/0120219 A1 | 5/2014 | Ewell, Jr. et al. |
| 2014/0132643 A1 | 5/2014 | Yamazaki et al. |
| 2014/0160978 A1 | 6/2014 | Palin |
| 2014/0170275 A1* | 6/2014 | Bordin ................ A23L 5/10 |
| | | 99/325 |
| 2014/0234496 A1 | 8/2014 | Siegel et al. |
| 2014/0292536 A1 | 10/2014 | Barth et al. |
| 2014/0321321 A1 | 10/2014 | Knaappila |
| 2014/0345474 A1 | 11/2014 | Trench Rocha et al. |
| 2014/0356495 A1 | 12/2014 | Teuscher |
| 2015/0066516 A1 | 3/2015 | Nishikawa et al. |
| 2015/0153048 A1 | 6/2015 | Moro |
| 2015/0172391 A1 | 6/2015 | Kasslin et al. |
| 2015/0172901 A1 | 6/2015 | Kasslin et al. |
| 2015/0172902 A1 | 6/2015 | Kasslin et al. |
| 2015/0208845 A1 | 7/2015 | Robbins et al. |
| 2015/0208858 A1 | 7/2015 | Robbins et al. |
| 2015/0292749 A1 | 10/2015 | Kim et al. |
| 2015/0373749 A1 | 12/2015 | Palin |
| 2015/0374162 A1 | 12/2015 | Nonaka et al. |
| 2016/0029149 A1 | 1/2016 | Morikawa et al. |
| 2016/0037966 A1 | 2/2016 | Chin et al. |
| 2016/0051078 A1 | 2/2016 | Jenkins et al. |
| 2016/0095169 A1 | 3/2016 | Sanchez |
| 2016/0113438 A1 | 4/2016 | Hanson et al. |
| 2016/0198885 A1 | 7/2016 | Logan et al. |
| 2016/0234206 A1 | 8/2016 | Tunnell et al. |
| 2016/0349743 A1* | 12/2016 | Burkhardt ........... A47J 37/1266 |
| 2016/0372005 A1 | 12/2016 | Bajpai |
| 2016/0374501 A1 | 12/2016 | Logan |
| 2017/0150841 A1 | 6/2017 | Johncock |
| 2017/0238749 A1 | 8/2017 | Vengroff et al. |
| 2017/0238751 A1 | 8/2017 | Vengroff |
| 2017/0243515 A1 | 8/2017 | Vengroff et al. |
| 2018/0199761 A1 | 7/2018 | Gogorza Segurola |
| 2018/0242772 A1 | 8/2018 | Jenkins |
| 2018/0310759 A1 | 11/2018 | Jenkins |
| 2018/0310760 A1 | 11/2018 | Jenkins |
| 2019/0104572 A1 | 4/2019 | Clark |
| 2019/0125120 A1 | 5/2019 | Jenkins |

FOREIGN PATENT DOCUMENTS

| | | |
|---|---|---|
| CN | 101273834 A | 10/2008 |
| CN | 103792859 A | 5/2014 |
| CN | 104161443 | 11/2014 |
| CN | 104490249 A | 4/2015 |
| CN | 104913351 A | 9/2015 |
| CN | 204862574 U2 | 12/2015 |
| CN | 107092201 | 8/2017 |
| CN | ZL2017201510922 | 1/2018 |
| DE | 4405610 | 8/1995 |
| DE | 20 2014 004 271 | 8/2014 |
| EP | 0725556 A2 | 8/1996 |
| EP | 1758431 | 2/2007 |
| EP | 2312218 | 4/2011 |
| EP | 3416527 | 12/2018 |
| FR | 2945608 | 11/2010 |
| JP | S60-23724 | 2/1985 |
| JP | 11-51385 | 2/1999 |
| JP | 2006-105557 | 4/2006 |
| JP | 2007194100 | 8/2007 |
| JP | 2010-192274 | 9/2010 |
| JP | 2014534867 | 12/2014 |
| JP | 2015050766 | 3/2015 |
| JP | 2019509454 | 4/2019 |
| SG | 11201806971 A | 10/2018 |
| TW | M505272 U | 7/2015 |
| TW | 201729737 | 9/2017 |
| TW | M554320 | 1/2018 |
| WO | 99/41950 | 8/1999 |
| WO | 200101432 | 1/2001 |
| WO | 2008119207 | 10/2008 |
| WO | 2008/154763 A1 | 12/2008 |

(56) References Cited

FOREIGN PATENT DOCUMENTS

| WO | 2011/113334 A1 | 9/2011 |
|---|---|---|
| WO | 2012006674 | 1/2012 |
| WO | 2012/092863 A1 | 7/2012 |
| WO | 2013/175441 A1 | 11/2013 |
| WO | 2012124349 | 7/2014 |
| WO | 2015128578 | 9/2015 |
| WO | 2015135031 | 9/2015 |
| WO | 2015136205 | 9/2015 |
| WO | 2016/028921 A1 | 2/2016 |

OTHER PUBLICATIONS

Examiner's Report dated Jun. 20, 2018 issued in Canadian Patent Application No. 3,016,142.
Office Action issued in Korean application 10-2018-7023911 dated Sep. 23, 2018.
International Search Report and Written Opinion dated Feb. 11, 2019 for PCT/US2018/058486.
Extended European Search Report dated Nov. 19, 2019 for European Patent Application No. 17753891.5.
Office Action issued in Korean Patent Application 10-2018-7027033 dated Aug. 26, 2019.
Official Letter dated Jul. 18, 2018 issued in Taiwan Application No. 106202377.
Search Report and Written Opinion dated Jan. 9, 2020 issued in Singapore Patent Application No. 11201807308T.
Search Report and Written Opinion dated Jan. 7, 2020 issued in Singapore Patent Application No. 11201806971Q.
Search Report and Written Opinion dated Jan. 9, 2020 issued in Singapore Patent Application No. 11201806970V.
International Search Report and Written Opinion dated Jan. 27, 2016 issued for POT/US2015/045944.
First Examination Report dated Nov. 3, 2017 issued in New Zealand Patent Application No. 729778.
Examination Report No. 1 dated Dec. 19, 2017 issued in Australian Patent Application No. 2015305556.
Examiner's Report dated Jan. 29, 2018 issued in Canadian Patent Application No. 2,957,723.
Further Examination Report dated Mar. 19, 2018 issued in New Zealand Patent Application No. 729778.
Notice of Reasons for Refusal dated May 1, 2018 issued in Japanese Patent Application No. 2017-508687, along with English translation.
International Preliminary Report on Patentability dated Jan. 21, 2017 for PCT/US2015/045944.
International Search Report and Written Opinion dated Jun. 28, 2018 for PCT/US2018/029824.
"Pantelligent: Intelligent Pan—Cook Everything Perfectly" https://www.kickstarter.com/projects/hevans/pan-cook-everything-perfe/description.
"Paragon /Indiegogo: Pre-Order your Paragon on Indiegogo today" http://paragon.webflow.io/.
Wall, Alix "Smart Pan Creator Hopes to Revolutinize Cooking with Smarty Pans" http://ww2.kqed.org/bayareabites/2014/09/25/Smart-Pan-Creator-Hopes-to-Revolutinize-Cooklng-with-smartypans/.
Notice of Reasons for Refusal issued in Japanese Patent Application 2018-543655 dated Aug. 26, 2019.
Extended European Search Report dated Sep. 23, 2019 for European Patent Application No. 17753923.

Extended European Search Report dated Jul. 23, 2019 for European Patent Application No. 17753947.5.
Notice of Reasons for Refusal dated Jun. 25, 2019 issued in corresponding Japanese Patent Application No. 2018-543623, along with English translation.
Notice of Reasons for Refusal dated Sep. 19, 2019 issued in Japanese Patent Application No. 2018-208919, along with English translation.
Examiner's Report dated Nov. 29, 2018 issued in corresponding Australian Patent Application No. 2017220091.
Examiner's Report dated May 31, 2019 issued in corresponding Canadian Patent Application No. 3,015,698.
Examiner's Report dated May 1, 2019 issued in Canadian Patent Application No. 3,015,304.
First Office Action and Search Report dated Jan. 16, 2019 issued in Chinese Patent Application No. 201710094388X with English translations.
Second Office Action dated Sep. 29, 2019 issued in Chinese Patent Application No. 201710094388X with English translation.
First Office Action issued in Chinese Patent Application No. 2015105125493 with English Translation.
Search Report issued in Chinese Patent Application No. 2015105125493 with English Translation.
Examiner's Report dated Feb. 5, 2020 issued in Canadian Patent Application No. 3,015,304.
Wikipedia contributors (Sep. 27, 2019) "MAC address" Wikipedia, The Free Encyclopedia. Retrieved 01:55, Oct. 2, 2019 from https://en.wikipedia.org/w/index.php?title=MAC_adddress&oldid=918173830 (Year:2019).
"Impact of Multiple Inquirers on the Bluetooth Discovery Process" by Anne Franssens; Jul. 2010: Retrieved from the Internet Oct. 2, 2019 from https://essay.utwente.nl/59681/1/MA_scriptie_A_Frassens.pdf (Year: 2010).
Examiner's Report dated Feb. 19, 2020 issued in Canadian Patent Application No. 3,015,698.
https://devzone.nordicsemi.com/tutorials/5/.
http://www.blendtec.com/blenders/designer-725.
http://www.goodhousekeeping.com/appliances/blender-reviews/a33140/blendtec-designer-725/.
PCT International Search Report and Written Opinion for PCT/US2017/018310 dated May 24, 2017.
PCT International Search Report and Written Opinion for PCT/US2017/018425 dated Jun. 1, 2017.
PCT International Search Report and Written Opinion for PCT/US2017/018365 dated May 24, 2017.
Office Action for U.S. Appl. No. 14/830,581 dated Jun. 28, 2017.
Office Action issued in corresponding Taiwan Patent Application No. 106105451, dated Mar. 9, 2018 (with English translation).
PCT International Search Report and Written Opinion for PCT/US2018/029919 dated Aug. 14, 2018.
Office Action issued in corresponding Taiwan Patent Application No. 106105451, dated Jul. 16, 2018 (with English translation).
U.S. Appl. No. 15/434,695, filed Feb. 16, 2017.
Examination Report issued in connection with corresponding Australian Patent Application No. 2017220002, dated Nov. 19, 2018.
Office action issued in corresponding Japanese application No. 2018-543655, dated Apr. 7, 2020.
Notice of Acceptance dated Mar. 18, 2019 in corresponding Australian Patent Application No. 2017220002.

\* cited by examiner

COOKING SYSTEM WITH ERROR DETECTION

CROSS-REFERENCE TO RELATED APPLICATIONS

This application is a continuation-in part of U.S. patent application Ser. No. 15/434,695 filed Feb. 16, 2017, which claims priority to U.S. Provisional Patent Application No. 62/297,134 filed Feb. 18, 2016, and further claims priority to U.S. Provisional Patent Application No. 62/302,018 filed Mar. 1, 2016, the entirety of all of which are incorporated herein by reference.

TECHNICAL FIELD

This disclosure relates generally to the field of cooking appliances and more specifically to a cooking system with error detection.

BACKGROUND

Traditionally, a user has cooked food by manually turning on a heat source using a knob, placing the food over the heat source, and estimating (or measuring or timing) when the food is done cooking. Such traditional cooking techniques, however, may be deficient.

SUMMARY

In a first example, a system comprises a first heat source operable to provide an amount of energy to be used to cook a food item during a cooking process; and a processor operable, when executed, to: establish a communication link with a first cooking device system operable to be used in cooking the food item; receive, via the communication link with the first cooking device system, an indication of a current temperature associated with the food item; receive an indication of an amount of energy provided by the first heat source; and based on the indication of the current temperature associated with the food item and the indication of the amount of energy provided by the first heat source, determine that there is an error in the cooking process; and transmit an indication of the error in the cooking process.

Another example includes any such system, wherein the system further comprises a heat source system that comprises the heat source and the processor.

Another example includes any such system, wherein the system further comprises a wireless device that comprises the processor.

Another example includes any such system, wherein the processor is further operable to transmit the indication of the error in the cooking process to a wireless device.

Another example includes any such system, wherein the processor is further operable to transmit the indication of the error in the cooking process for display to a user.

Another example includes any such system, wherein the error in the cooking process comprises the first cooking device system being positioned on a wrong heat source.

Another example includes any such system, wherein the error in the cooking process comprises a wrong cooking device system being positioned on the first heat source.

In a second example, a system comprises a heat source system comprising a plurality of heat sources, each heat source operable to provide an amount of energy to be used to cook a food item during a cooking process; a sensor operable to detect information associated with the cooking process; and a processor operable, when executed, to: determine an identity of a first cooking device system to be used in cooking the food item; determine an identity of a first heat source of the plurality of heat sources to be used to provide the amount of energy to be used to cook the food item; receive an indication of the detected information associated with the cooking process; based on the indication of the detected information associated with the cooking process, determine whether the first cooking device system is positioned properly with regard to the first heat source; and following a determination that the first cooking device system is not positioned properly with regard to the first heat source, transmit an indication of the error in the cooking process.

Another example includes any such system, wherein the system further comprises a wireless device that comprises the processor.

Another example includes any such system, wherein the processor is further operable to transmit the indication of the error in the cooking process for display to a user.

Another example includes any such system, wherein the sensor comprises a weight sensor operable to detect a weight or force applied to at least one of the plurality of heat sources.

Another example includes any such system, wherein the sensor comprises a Near Field Communication (NFC) sensor or a radio frequency identification (RFID) sensor operable to detect a wireless signal transmitted by the first cooking device system.

Another example includes any such system, wherein the sensor comprises a motion sensor operable to detect one or more motions associated with at least one of the plurality of heat sources.

Another example includes any such system, wherein the sensor comprises a camera operable to generate one or more images of the plurality of heat sources.

Another example includes any such system, wherein the sensor comprises a temperature sensor operable to detect a temperature associated with at least one of the plurality of heat sources.

Another example includes any such system, wherein the processor is further operable to determine that the first cooking device system is not positioned properly with regard to the first heat source when the first cooking device system is not positioned on or in the first heat source.

Another example includes any such system, wherein the processor is further operable to determine that the first cooking device system is not positioned properly with regard to the first heat source when the first cooking device system is positioned on or in another heat source of the plurality of heat sources.

Another example includes any such system, wherein the processor is further operable to determine that the first cooking device system is not positioned properly with regard to the first heat source when another cooking device system is positioned on or in the first heat source.

Another example includes any such system, wherein the sensor is positioned on or in the heat source system.

In a third example, a system comprises a plurality of cooking device systems, each cooking device system operable to be used in cooking a food item during a cooking process; a sensor operable to detect information associated with the cooking process; a processor operable, when executed, to: determine an identity of a first cooking device system of the plurality of cooking device systems; receive an indication of the detected information associated with the cooking process; based on the indication of the detected information associated with the cooking process, determine whether the first cooking device system is currently being used in the cooking process; and following a determination that the first cooking device system is not currently being used in the cooking process, transmit an indication of the error in the cooking process.

Another example includes any such system, wherein the system further comprises a wireless device that comprises the processor.

Another example includes any such system, wherein the processor is further operable to transmit the indication of the error in the cooking process for display to a user.

Another example includes any such system, wherein the sensor comprises a motion sensor operable to detect one or more motions associated with the first cooking device system.

Another example includes any such system, wherein the sensor comprises a temperature sensor operable to detect a temperature associated with the food item.

Another example includes any such system, wherein the sensor comprises a pressure sensor operable to detect a pressure applied to at least a portion of the first cooking device system.

Another example includes any such system, wherein the sensor comprises a Near Field Communication (NFC) sensor or a radio frequency identification (RFID) sensor operable to detect a wireless signal transmitted by a heat source system.

Another example includes any such system, wherein the sensor comprises an electromagnetic radiation sensor operable to detect electromagnetic radiation emitted by a heat source.

Another example includes any such system, wherein the processor is further operable to determine that the first cooking device system is not currently being used in the cooking process when a user is holding or moving another cooking device system of the plurality of cooking device systems.

Another example includes any such system, wherein the processor is further operable to determine that the first cooking device system is not currently being used in the cooking process when another cooking device system of the plurality of cooking device systems is positioned on or in a heat source.

Another example includes any such system, wherein the sensor is positioned in or on the cooking device system.

Another example includes any such system, wherein: the sensor is positioned in or on the first cooking device system; the system further comprises a heat source system that comprises: a heat source operable to provide an amount of energy to be used to cook the food item during the cooking process; and a second sensor positioned in or on the heat source system, the second sensor operable to detect additional information associated with the cooking process; and the processor is further operable, when executed, to: receive an indication of the detected additional information associated with the cooking process; and based on the indication of the detected information associated with the cooking process and further based on the indication of the detected additional information associated with the cooking process, determine whether the first cooking device system is currently being used in the cooking process.

In a fourth example, a system comprises a plurality of cooking device systems, each cooking device system operable to be used in cooking a food item during a cooking process; a heat source system comprising a plurality of heat sources, each heat source operable to provide an amount of energy to be used to cook the food item during a cooking process; a sensor operable to detect information associated with the cooking process; a processor operable, when executed, to: determine an identity of a first cooking device system of the plurality of cooking device systems; determine an identity of a first heat source of the plurality of heat sources; receive an indication of the detected information associated with the cooking process; based on the indication of the detected information associated with the cooking process, determine whether there is an error in the cooking process; and following a determination that there is an error in the cooking process, transmit an indication of the error in the cooking process.

Another example includes any such system, wherein the error in the cooking process comprises the first cooking device system being positioned on another heat source of the plurality of heat sources.

Another example includes any such system, wherein the error in the cooking process comprises another cooking device system of the plurality of cooking device systems being positioned on the first heat source.

Another example includes any such system, wherein the error in the cooking process comprises a user holding or moving another cooking device system of the plurality of cooking device systems.

Another example includes any such system, wherein the error in the cooking process comprises a user adding the food item to another cooking device system of the plurality of cooking device systems.

Another example includes any such system, wherein the error in the cooking process comprises a user prematurely positioning the first cooking device system on or in the first heat source or prematurely removing the first cooking device system from the first heat source.

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Embodiments of the present disclosure are best understood by referring to FIGS. 1A-10 of the drawings, like numerals being used for like and corresponding parts of the various drawings.

Figure 1A:
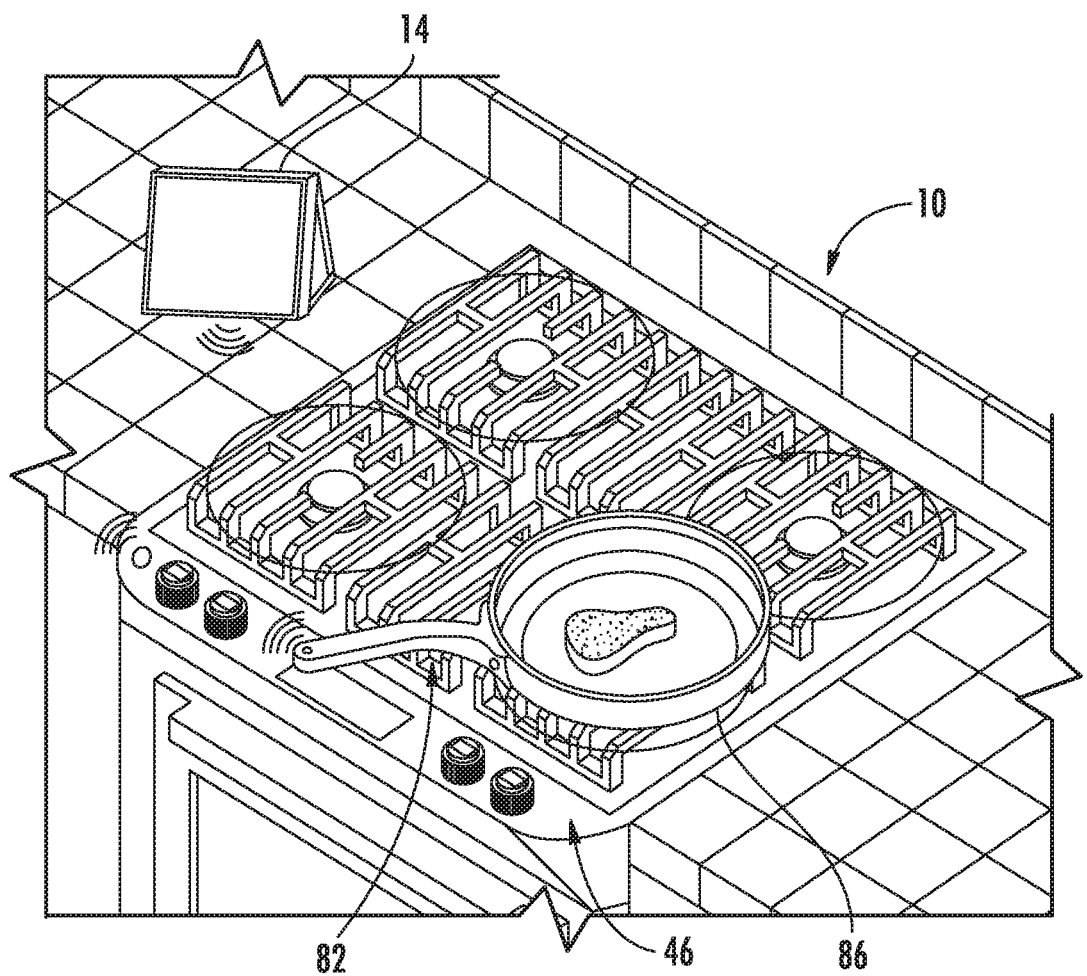
FIGS. 1A-1B illustrate an example cooking system that may assist a user in cooking a food item.
Figure 1B:
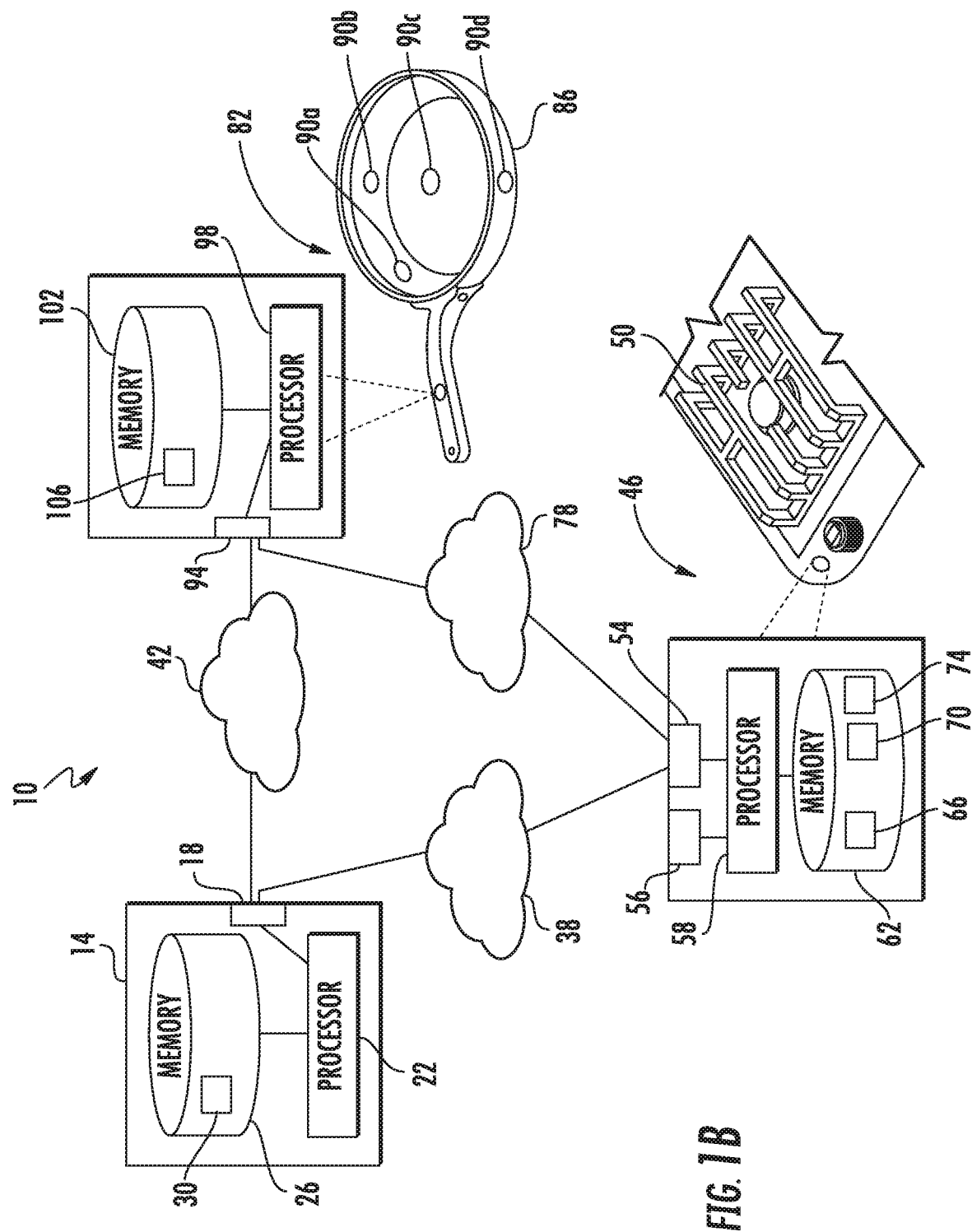

FIGS. 1A-1B illustrate an example cooking system 10 that may assist a user in cooking a food item (such as a steak or chili). As is illustrated, the cooking system 10 includes a wireless device 14 (such as a mobile phone or tablet) that may execute an electronic cookbook 30. Additionally, the cooking system 10 includes a heat source system 46 (such as a gas burner system, an electric burner system or an induction burner system) and a cooking device system 82 (such as a cooking pan or pot) to be used in cooking the food item.

In one example of operation of FIGS. 1A-1B, a user may desire to cook a food item, such as a steak or chili. To do so, the user may utilize their wireless device 14 (such as their mobile phone or tablet) to select a particular recipe for the food item displayed by the electronic cookbook 30 on the wireless device 14. Based on the selection, the wireless device 14 may establish a first communication link (such as a BLUETOOTH communication link (where BLUETOOTH is generically referred to as IEEE 802.15.1) or a WI-FI communication link (where WI-FI is generically referred to as IEEE 802.11)) with the heat source system 46 (such as a stove top) to be used in cooking the food item. In one embodiment, the first communication link with the heat source system 46 may be a wired connection, e.g., via a USB or serial connection.

The wireless device 14 may use this communication link to transmit cooking instructions 70 to the heat source system 46. The cooking instructions 70 may include a particular temperature (such as 375° F.) and a particular duration of time (such as 10 minutes). These cooking instructions 70 may cause the heat source 50 (such as the front left gas burner of the stove top) of the heat source system 46 to begin providing energy to the cooking device 86 (such as a 5 quart pot) of the cooking device system 82. For example, the cooking instructions 70 may cause the heat source 50 to provide a flame (or other source of energy) having an intensity that varies over time so as to raise the temperature of the cooking device 86 to the desired cooking temperature (such as 375° F.) and then maintain that particular temperature (such as 375° F.) for the duration of the cooking process. Furthermore, the cooking instructions 70 may further cause the heat source 50 to provide such a flame for the particular duration of time (such as 10 minutes), adjusting the intensity of the flame using control algorithms to maintain the desired cooking temperature throughout the process.

In addition to the first communication link between the wireless device 14 and the heat source system 46, the heat source system 46 may establish a second communication link (such as a second BLUETOOTH communication link or a second WI-FI communication link) with the cooking device system 82. The cooking device system 82 may utilize the second communication link to transmit measurement information 74 to the heat source system 46. For example, the cooking device system 82 may measure a current temperature associated with the food item, and may communicate this current temperature to the heat source system 46 as the measurement information 74. Based on the measurement information 74, the heat source system 46 may make one or more changes or adjustments to the amount of energy provided by the heat source 50. For example, if the measurement information 74 indicates that the current cooking temperature is below the intended temperature of 375° F., the heat source system 46 may increase the amount of energy provided by the heat source 50. As another example, if the measurement information 74 indicates that the current cooking temperature is above the intended temperature of 375° F., the heat source system 46 may decrease the amount of energy provided by heat source 50. As a further example, if the measurement information 74 indicates that the current cooking temperature is at the intended temperature of 375° F., the heat source system 46 may continue to provide the same amount of energy. As a further example, if the measurement information 74 indicates that the current cooking temperature is below the intended temperature of 375° F. but rising rapidly in such a manner that it is likely to overshoot the intended temperature, the heat source system 46 may decrease the amount of energy provided by the heat source 50. As a further example, the heat source system 46 may make any of a variety of adjustments to the amount of energy provided by the heat source based on the operation of a feedback or feed forward algorithm (for example a proportional-integral-derivative (PID) algorithm) on a series of temperature measurements or other measurement information 74.

As is discussed above, the cooking system 10 of FIGS. 1A-1B includes a wireless device 14. Wireless device 14 represents any suitable components that may communicate with a user so as to provide cooking information (such as cooking recipes) to the user, and that may further communicate with the heat source system 46 to assist the user in cooking. Additionally, the wireless device 14 may further communicate with the cooking device system 82 to further assist the user in cooking. Wireless device 14 may be a laptop, a mobile telephone or cellular telephone (such as a Smartphone), an electronic notebook, a tablet (such as an iPad), a personal digital assistant, a video projection device, any other device capable of receiving, processing, storing, and/or communicating information with other components of system 10, or any combination of the preceding. As is illustrated in FIGS. 1A-1B, the wireless device 14 is a tablet. Furthermore, as illustrated, wireless device 14 includes a network interface 18, a processor 22, and a memory unit 26.

Network interface 18 represents any suitable device operable to receive information from network 38 and/or network 42, transmit information through network 38 and/or network 42, perform processing of information, communicate to other devices, or any combination of the preceding. For example, network interface 18 receives measurement information 74 (such as a current temperature associated with the cooking of a food item) from the cooking device system 82. As another example, network interface 18 communicates cooking instructions 70 to the heat source system 46. Network interface 18 represents any port or connection, real or virtual, including any suitable hardware and/or software, including protocol conversion and data processing capabilities, to communicate through a local area network (LAN), a metropolitan area network (MAN), a wide area network (WAN), or other communication system that allows wireless device 14 to exchange information with network 38, network 42, heat source system 46, network 78, cooking device system 82, or other components of system 10.

Processor 22 communicatively couples to network interface 18 and memory unit 26, and controls the operation and administration of wireless device 14 by processing information received from network interface 18 and memory unit 26. Processor 22 includes any hardware and/or software that operates to control and process information. For example, processor 22 executes an electronic cookbook 30 to control the operation of wireless device 14, such as to cause the wireless device 14 to communicate with a user so as to provide cooking information (such as cooking recipes) to the user, and to further communicate with the heat source system 46 to assist the user in cooking. Processor 22 may be a programmable logic device, a microcontroller, a microprocessor, any suitable processing device, or any combination of the preceding.

Memory unit 26 stores, either permanently or temporarily, data, operational software, or other information for processor 22. Memory unit 26 includes any one or a combination of volatile or non-volatile local or remote devices suitable for storing information. For example, memory unit 26 may include random access memory (RAM), read only memory (ROM), magnetic storage devices, optical storage devices, any other suitable information storage device, or any combination of the preceding. While illustrated as including particular information modules, memory unit 26 may include any suitable information for use in the operation of wireless device 14.

As illustrated, memory unit 26 includes the electronic cookbook 30. Electronic cookbook 30 represents any suitable set of instructions, logic, or code embodied in a computer-readable storage medium and operable to facilitate the operation of wireless device 14 with regard to cooking and/or the electronic cookbook 30. Memory unit 26 may further include any other suitable set of instructions, logic, or code embodied in computer-readable storage medium and operable to facilitate other operations of wireless device 14, such as a telephone function of the wireless device 14, any other Smartphone or tablet function of the wireless device 14, any other function of the wireless device 14, or any combination of the preceding.

The electronic cookbook 30 may provide the user with instructions (and other content) associated with cooking. For example, the electronic cookbook 30 may provide the user with one or more cooking recipes and additional content that may assist the user in cooking a food item (such as a steak or chili).

Furthermore, the electronic cookbook 30 may be in communication with the heat source system 46. The electronic cookbook 30 and the heat source system 46 may be in 1:1 signal communication, e.g., via BLUETOOTH technology. This 1:1 signal communication may allow two-way communication, such that both the electronic cookbook 30 and the heat source system 46 (and/or the cooking device system 82) may send signals to each other, and receive signals from each other. Additionally, as described herein, the electronic cookbook 30 (and wireless device 14) and the heat source system 46 may utilize other communication schemes.

The electronic cookbook 30 may communicate with the heat source system 46 to execute one or more stages (or steps) of bringing the cooking device 86 (or a cooking environment associated with the food item) to a desired temperature as specified by the cooking recipe and for a duration of time specified by the cooking recipe. Time and/or temperature control provided by the operation of the electronic cookbook 30 may be used to eliminate mistakes that may otherwise occur when setting the amount of energy provided by the heat source 50 (e.g., heat source output). In some examples, the electronic cookbook 30 may be in signal communication with one or both of the heat source system 46 and the cooking device system 82 to cause the control of the food environment at the precise temperature set forth in the cooking recipe by measurements of temperature and modulation or adjustment of the energy provided by the heat source 50 (e.g., heating units of the heating source system 46) to maintain the food environment at precisely the desired temperature, as is discussed in further detail below.

Also, the electronic cookbook 30 may be in communication with the cooking device system 82. The electronic cookbook 30 and cooking device system 82 may be in 1:1 communication (e.g., 1:1 BLUETOOTH communication) for at least a portion of the cooking process. As other examples, as described herein, the electronic cookbook 30 (and wireless device 14) and the cooking device system 82 may utilize other communication schemes. The communication between the electronic cookbook 30 and the cooking device system 82 may allow the electronic cookbook 30 to check the power source level of the cooking device system 82, or check any other information associated with the cooking device system 82. Furthermore, the cooking device system 82 may advertise device or environmental information such as device ID and temperature for use by the electronic cookbook 30. Also, the cooking device system 82 may include a receiver for receiving prompts or requests from the electronic cookbook (for example) to define advertising content.

The electronic cookbook 30 may allow users, such as novice cooks, to obtain professional results because the precise control of temperature and timing afforded by the electronic control of the heat source system 46 may provide reproducible results, not requiring the use of a chefs expertise in judging food doneness from a combination of the feel, texture, and color of the food during the cooking process.

The electronic cookbook 30 may provide expert guidance in the preparation of ingredients before cooking to assist the user in achieving optimal results. For example, the electronic cookbook 30 may provide expert guidance in one or more food preparation steps required prior to cooking or one or more finishing steps after cooking to assist the user in achieving optimal results.

The electronic cookbook 30 may optionally provide additional content that may be used to increase the user's skill level and judgment of foodstuffs being at a stage (or step) to start another stage (or step) in a cooking recipe, such as from a combination of the feel, texture and color of the food during the cooking process. This guidance may be available (or optionally available) at various stages or at each stage in the cooking recipe and may include display of a picture and/or video of techniques such as cutting, dicing, filleting, mixing, or stirring techniques. A display may also include pictures and/or video of a desired appearance of food after the successful completion of a stage. As an example, after the electronic cookbook 30 provides an instruction to dice carrots to a particular size, the user may optionally view a video of a suitable dicing technique or view a video or picture of the desired prepared ingredients, e.g., how the diced carrots should look when prepared, at the end of the step.

The electronic cookbook 30 may utilize a display screen of the wireless device 14 (or any other device in communication range of the wireless device, such as a small projection display or a conveniently located display built into an appliance (e.g., a front panel display (FPD) on refrigerator)) or a virtual reality or augmented reality display device in use by a user to allow a user to easily view, receive, or play the recipe instructions. Display aspects of the electronic cookbook 30, for example, may better illustrate complicated preparation techniques compared to text. In some examples, the electronic cookbook 30 may include reminders to users of proper or safe ways to use cookware or utensils. The electronic cookbook 30 may also be configured to avoid mistakes or oversights by deploying check lists, reminders, and/or timers which may leave little room for ambiguity. Such features may be optional and selectable by the user. Display features may provide a user important information from which to decide whether to attempt a recipe. For example, a user may skip forward through the steps of a recipe to view complicated or time consuming steps before attempting them. In some examples, the electronic cookbook 30 includes a search function allowing the user to search specific foods, steps, heat source, difficulty, dietary nutrients or calories per serving, prep time, cook time, cost, or other search criteria to assist users with menu planning and special diets.

In some examples, the electronic cookbook 30 may display text of the steps of a recipe alongside a video demonstration of the step, with an audio track optionally playing either the video demonstration sound track or the text portion. For example, a traditional recipe first lists the ingredients and equipment, and at times the preparation and cooking time. The electronic cookbook 30 may be configured to present any combination of a static image and a first video segment, which could be a still shot or a pan shot showing the ingredients and/or what the finished dish looks like with nutritional information and preparation time in the text portion.

The next step in the recipe may illustrate how to prepare the ingredients, such as for example by showing how to chop, slice, dice, mix, perform any other culinary technique, or any combination of the preceding. The next steps may be presented in the order of cooking and then the final presentation.

The following table outlines an example display format for a recipe displayed by the electronic cookbook 30, in which each line in the table lists the content that may be displayed, and each line may be a separate display, a portion of a scrollable display from other portions, or a highlighted portion of the entire display.

| Optional Video or image content | Optional Audio Content | Text, UI or GUI |
| --- | --- | --- |
| Video or still age of the finished, dished food item | The video narrative or reading the text | Title of the recipe or food item, and optionally preparation time, calories and other nutritional information (see FIG. 3) Map of the stage (or step) in the recipe and control icons to skip ahead (all steps), forward, and backward, i.e. one or more navigation icons between stages (or steps), and content selection (video, picture and/or audio), now referred to as Navigation icons (see FIGS, 4-8) |
| Video pan of the ingredients, still shots of ingredients, or videos of one ingredient after another | The video narrative or reading the text | List of ingredients and quantities (See FIG. 3) Navigation icons |
| Video of the preparation procedure | The video narrative or reading the text | How to prepare or mix the ingredients, such as "fine dice the celery and onions" (FIGS. 4-8) Navigation icons |
| Video of the preparation step | The video narrative or reading the text | Pre-heating the oven, cookware, etc. Navigation icons Heat source system 46 and cooking device system 82 confirmation and pairing in signal communication Navigation icons |
| Video of the cooking procedure, showing exactly what the food should look like when it is properly cooked, optionally a running timer showing how long the step should take at the proper temperature | The video narrative, reading the text, or alarm when the cooking stage should be finished | Cooking procedure: Text and icons for transmitting instruction to the heat source system 46, explaining when to turn or mix the food, how to tell when it is done, when to put it aside for the next stage (FIGS. 4-8) icons or text showing remaining cooking time navigation icons |

From the above non-limiting example of the type of information that may be displayed by the electronic cookbook 30, recipes generally involve some stage of preparation (or steps), such as gathering and measuring ingredients, and mixing and/or cooking stages. Using the above recipe display format, a user may move within a recipe between display of the stages or steps to be followed, the techniques, and the appearance of the food to obtain a full appreciation of the recipe.

For example, when a recipe includes complex steps, such as novel preparation techniques, a user may interface with the electronic cookbook 30 to visually verify that the food item the user has prepared has the proper appearance, texture, or color at one or more stages of the recipe. Therefore, before navigating to the next step in the recipe, the user may navigate through images or other content, such as text, to verify satisfactory completion of the step or stage. The electronic cookbook may also use image recognition algorithms on images of the cooking process taken by one or more cameras that are part of the wireless device 14 (or any other device in communication range of the wireless device) in order to provide feedback to the user on proper appearance, texture, color or doneness of the food.

Additional information regarding the electronic cookbook 30 is discussed below. Additionally, example screenshots displayed by the electronic cookbook 30 on the wireless device 14 (or any other device) are illustrated in FIGS. 2-8.

Network 38 represents any suitable network operable to facilitate communication between the components of system 10, such as wireless device 14 and heat source system 46. Network 38 may include any interconnecting system capable of transmitting audio, video, signals, data, messages, or any combination of the preceding. Network 38 may include all or a portion of a public switched telephone network (PSTN), a public or private data network, a LAN, a MAN, a WAN, a WPAN, a local, regional, or global communication or computer network, such as the Internet, a wireline or wireless network, an enterprise intranet, or any other suitable communication link, including combinations thereof, operable to facilitate communication between the components. Preferable examples of network 38 may include a WPAN (which may include, for example, BLUETOOTH, BLUETOOTH low power, BLUETOOTH 5, ANT+, Zigbee (IEEE 802.15.4), other IEEE 802.15 protocols, IEEE 802.11 A, B or G without limitation, and WI-FI (IEEE 802.11)), a cellular communication network, an infrared communication network, any other wireless network operable to facilitate communication between the components, or any combination of the preceding.

Network 42 represents any suitable network operable to facilitate communication between the components of system 10, such as wireless device 14 and cooking device system 82. Network 42 may include any interconnecting system capable of transmitting audio, video, signals, data, messages, or any combination of the preceding. Network 42 may include all or a portion of a PSTN, a public or private data network, a LAN, a MAN, a WAN, a WPAN, a local, regional, or global communication or computer network, such as the Internet, a wireline or wireless network, an enterprise intranet, or any other suitable communication link, including combinations thereof, operable to facilitate communication between the components. Preferable examples of network 42 may include a WPAN, a cellular communication network, an infrared communication network, any other wireless network operable to facilitate communication between the components, or any combination of the preceding. Furthermore, network 42 may be the same type of network as network 38, or network 42 may be a different type of network than network 38. For example, both network 42 and network 38 may be a BLUETOOTH communication network. As another example, network 42 may be WI-FI communication network, while network 38 may be a BLUETOOTH communication network. Additionally, although network 42 and network 38 are illustrated as separate networks, network 42 and network 38 may be the same network.

Heat source system 46 represents any suitable components that can provide an amount of energy to cook a food item, and that can further communicate with the wireless device 14 to assist the user in cooking. Additionally, the heat source system 46 may also communicate with the cooking device system 82 to assist the user in cooking.

As is illustrated, the heat source system 46 includes a heat source 50, a network interface 54, a user interface system 56, a processor 58, and a memory unit 62. The heat source 50 may be any device that may provide an amount of energy to cook a food item. For example, the heat source 50 may be a burner (such as an induction burner, gas burner, infrared burner, and/or heating coil), a resistive heating element, a heat lamp (such as Halogen lamp), an oven, a microwave, a stove top, a range, a grill, any other device that may provide an amount of energy to cook a food item, or any combination of the preceding. As is illustrated, the heat source 50 is a gas burner that provides heat energy in the form of a gas flame. The heat source system 46 may include any number of heat sources 50.

The heat source 50 may further be connected to a power source that provide power (or energy) to the heat source 50, thereby allowing the heat source 50 to provide an amount of energy to cook a food item. The power source may be any type of power source, such as an electrical power source (e.g., a battery or a connection to an electrical outlet), a gas power source (e.g., a gas canister or a connection to a gas line), any other source of power (or energy), or any combination of the preceding.

As is discussed above, the heat source system 46 further includes network interface 54, user interface system 56, processor 58, and memory unit 62. The network interface 54, user interface system 56, processor 58, and memory unit 62 may be positioned at any location on, in, or adjacent the heat source system 46 so as to allow the interface 54 and processor 58 to communicate with the heat source(s) 50 of the heat source system 46 and/or communicate with the wireless device 14 and/or the cooking device system 82. In such an example, the processor 58 may be communicatively coupled (and potentially physically or electrically coupled) to the heat source(s) 50 and/or the wireless device 14 and/or the cooking device system 82.

Network interface 54 represents any suitable device operable to receive information from network 38 and/or network 78, transmit information through network 38 and/or network 78, receive information from heat source 50, transmit information to heat source 50, perform processing of information, communicate to other devices, or any combination of the preceding. For example, network interface 54 receives temperature information or other measurement information 74 associated with the cooking of a food item from the wireless device 14 (and the electronic cookbook 30). Network interface 54 represents any port or connection, real or virtual, (including any suitable hardware and/or software, including protocol conversion and data processing capabilities, to communicate through a LAN, MAN, WAN, or other communication system) that allows heat source system 46 to exchange information with wireless device 14, network 38, network 42, network 78, cooking device system 82, or other components of system 10.

User interface system 56 represents any suitable components that allow a user to provide input to the heat source system 46 and/or that allow the heat source system 46 to provide output (such as a visual output) to the user of heat source system 46. For example, the user interface system 56 may include a touch sensor or a control knob that allows the user to input a desired amount of energy that is to be used by the heat source system 46 to cook a food item. As another example, the user interface system 56 may include light sources that may provide a visual representation of the amount of energy that is currently being used by the heat source system 46 to cook a food item.

Processor 58 communicatively couples to network interface 54, user interface system 56, and memory unit 62, and controls the operation and administration of heat source system 46 by processing information received from network interface 54, user interface system 56, and memory unit 62. Processor 58 includes any hardware and/or software that operates to control and process information. For example, processor 58 executes a heat source system management application 66 to control the operation of heat source system 46, such as to provide an amount of energy to cook a food item, and to communicate with the wireless device 14 to assist the user in cooking. Processor 58 may be a programmable logic device, a microcontroller, a microprocessor, any suitable processing device, or any combination of the preceding.

Memory unit 62 stores, either permanently or temporarily, data, operational software, or other information for processor 58. Memory unit 62 includes any one or a combination of volatile or non-volatile local or remote devices suitable for storing information. For example, memory unit 62 may include RAM, ROM, magnetic storage devices, optical storage devices, any other suitable information storage device, or any combination of the preceding. While illustrated as including particular information modules, memory unit 62 may include any suitable information for use in the operation of heat source system 46.

As illustrated, memory unit 62 includes heat source system management application 66, cooking instructions 70, and measurement information 74. Heat source system management application 66 represents any suitable set of instructions, logic, or code embodied in a computer-readable storage medium and operable to facilitate the operation of heat source system 46.

Cooking instructions 70 represent any set of instruction(s) that may be utilized by the heat source system 46 to assist the user in cooking. For example, the cooking instructions 70 may be a temperature that a food item is to be cooked at (such as 375° Fahrenheit), a period of time that a food item is to be cooked at a particular temperature (such as 45 minutes at 375° Fahrenheit), a food identifier that is to be added to food item (such as onions), any other information associated with cooking or a cooking recipe, or any combination of the preceding. The cooking instructions 70 may be received by the heat source system 46 from the wireless device 14.

Measurement information 74 represents any set of measurements associated with a food item in (or adjacent to) the cooking device system 82. For example, the measurement information 74 may be a current temperature associated with the food item (e.g., the current temperature the food item is being cooked at), a weight measurement associated with the food item, an acidity measurement associated with the food item, a measure of the degree to which chemical reactions associated with cooking (such as the Maillard reaction or denaturation of proteins) have occurred during cooking, any other measurement associated with the food item (or the cooking device system 82), or any combination of the preceding. The measurement information 74 may be received by the heat source system 46 from the cooking device system 82.

Network 78 represents any suitable network operable to facilitate communication between the components of system 10, such as heat source system 46 and cooking device system 82. Network 78 may include any interconnecting system capable of transmitting audio, video, signals, data, messages, or any combination of the preceding. Network 78 may include all or a portion of a PSTN, a public or private data network, a LAN, a MAN, a WAN, a WPAN, a local, regional, or global communication or computer network, such as the Internet, a wireline or wireless network, an enterprise intranet, or any other suitable communication link, including combinations thereof, operable to facilitate communication between the components. Preferable examples of network 78 may include a WPAN, a cellular communication network, an infrared communication network, any other wireless network operable to facilitate communication between the components, or any combination of the preceding. Furthermore, network 78 may be the same type of network as network 38 and/or network 42, or network 78 may be a different type of network than both network 38 and network 42. For example, each of network 38, network 42, and network 78 may be a BLUETOOTH communication network. As another example, network 78 may be a wired network, network 42 may be a WI-FI communication network, and network 38 may be a BLUETOOTH communication network. Additionally, although network 78, network 42, and network 38 are illustrated as separate networks, network 78 may be the same network as network 38 and/or network 42.

Cooking device system 82 represents any suitable components that may be used for cooking a food item. The cooking device system 82 may also communicate with the heat source system 46 to assist the user in cooking. Additionally, the cooking device system 82 may further communicate with the wireless device 14 to assist the user in cooking.

As is illustrated, the cooking device system 82 includes a cooking device 86, measurement sensors 90 (e.g., measurement sensors 90a-90d), a network interface 94, a processor 98, and a memory unit 102. The cooking device 86 may be any device that may be used in cooking a food item. For example, the cooking device 86 may be a food support platform that may support, hold, or enclose the food item while it is being cooked, such as a pot, a pan, a vessel, a tray, a grill platen, a grate, an oven, a pressure cooker, a rice cooker, a slow cooker, a microwave oven, a toaster oven, an oven, a teapot, any other device that may support, hold, or enclose a food item while it is being cooked, or any combination of the preceding. As another example, the cooking device 86 may be a cooking utensil, such as a spoon, tongs, a spatula, a measurement probe (such as a probe that measures temperature), any other utensil that may be used while cooking a food item, or any combination of the preceding. As is illustrated, the cooking device 86 is a cooking pan.

A measurement sensor 90 (e.g., measurement sensors 90a-90d) represents any sensor that may measure or sense (or otherwise provide) a measurement associated with a food item. For example, a measurement sensor 90 may be a temperature sensor that measures a temperature of the food item, a temperature adjacent the food item (such as a temperature of a portion of the cooking device 86 or a temperature of the environment inside or adjacent the cooking device 86), a temperature that the food item is being cooked at, any other temperature associated with cooking the food item, or any combination of the preceding. As another example, the measurement sensor 90 may measure volume, weight, moisture, acidity, alkalinity, color, pressure, liquid level, the denaturing of one or more proteins, any other attributes of the food item and/or the cooking device 86, or any combination of the preceding. As a further example, the measurement sensor 90 may be a chemical sensor, an accelerometer to measure a user's physical movement of the food item and/or the cooking device 86, motion sensors or other location sensors to determine if a user and/or the food item is at a particular location, any other type of sensor, or any combination of the preceding.

All of the measurement sensors 90 may measure or sense the same type of measurement (such as temperature), or one or more of the measurement sensors 90 may measure different types of measurements than the other measurement sensors (e.g., a first set of measurement sensors 90 may measure temperature and a second set of measurement sensors 90 may measure weight and/or liquid level). As is illustrated, the measurement sensors 90 are measurement sensors 90 that measure a temperature of various portions of the cooking device 86. The measurement sensor(s) 90 may be positioned at any location in, on, or adjacent the cooking device system 82 so as to allow the measurement sensor(s) 90 to measure information associated with the food item, and to further allow the measurement sensor(s) to transmit such information to the processor 98. The measurement sensor(s) 90 may be coupled to (or otherwise positioned at) any location in, on, or adjacent the cooking device system 82, and the measurement sensor(s) 90 may be coupled to (or otherwise positioned at) such a location in any manner. As an example, the measurement sensor(s) 90 may be bonded to the location (using an adhesive, for example), connected to the location using a rivet or a clip, positioned in-between two or more materials at the location (such as two or more layers of the material of the cooking device 86), formed integral with a device at the location (such as formed integral with all or a portion of the cooking device 86), coupled to the location in any other manner, or any combination of the preceding.

As is discussed above, the cooking device system 82 further includes network interface 94, a processor 98, and a memory unit 102. The network interface 94, processor 98, and memory unit 102 may be positioned at any location on, in, or adjacent the cooking device system 82 so as to allow the interface 94 and processor 98 to communicate with the measurement sensor(s) 90, and further communicate with the wireless device 14 and/or heat source system 46. In such an example, the processor 98 may be communicatively coupled (and potentially physically or electrically coupled) to the measurement sensor(s) 90 and/or the wireless device 14 and/or the heat source system 46. As is illustrated, the network interface 94, processor 98, and memory unit 102 are positioned in (or on) the handle of cooking device system 82. In some examples, the positioning of the network interface 94, processor 98, and memory unit 102 may protect these components from excessive heat.

Network interface 94 represents any suitable device operable to receive information from network 42 and/or network 78, transmit information through network 42 and/or network 78, receive information from measurement sensors 90, transmit information to measurement sensors 90, perform processing of information, communicate to other devices, or any combination of the preceding. For example, network interface 94 receives measurements from measurement sensors 90. As another example, network interface 94 transmits measurement information 74 to heat source system 46. Network interface 94 represents any port or connection, real or virtual, (including any suitable hardware and/or software, including protocol conversion and data processing capabilities, to communicate through a LAN, MAN, WAN, or other communication system) that allows cooking device system 82 to exchange information with wireless device 14, network 38, network 42, heat source system 46, network 78, or other components of system 10.

Processor 98 communicatively couples to network interface 94 and memory unit 102, and controls the operation and administration of cooking device system 82 by processing information received from network interface 94 and memory unit 102. Processor 98 includes any hardware and/or software that operates to control and process information. For example, processor 98 executes a cooking device system management application 106 to control the operation of cooking device system 82, such as to communicate with the heat source system 46 to assist the user in cooking, or to communicate with the wireless device 14 to assist the user in cooking. Processor 98 may be a programmable logic device, a microcontroller, a microprocessor, any suitable processing device, or any combination of the preceding.

Memory unit 102 stores, either permanently or temporarily, data, operational software, or other information for processor 98. Memory unit 102 includes any one or a combination of volatile or non-volatile local or remote devices suitable for storing information. For example, memory unit 102 may include RAM, ROM, magnetic storage devices, optical storage devices, any other suitable information storage device, or any combination of the preceding. While illustrated as including particular information modules, memory unit 102 may include any suitable information for use in the operation of cooking device system 82.

As illustrated, memory unit 102 includes cooking device system management application 106. Cooking device system management application 106 represents any suitable set of instructions, logic, or code embodied in a computer-readable storage medium and operable to facilitate the operation of cooking device system 82.

In an exemplary embodiment of operation of cooking system 10, a user may desire to cook a food item, such as steak or chili. To do so, the user may utilize their wireless device 14 (such as a mobile phone or tablet). In particular, the user may cause the wireless device 14 to execute the electronic cookbook 30. The user may cause the wireless device 14 to execute electronic cookbook 30 in any manner. For example, the electronic cookbook 30 may be an "app" installed on the wireless device 14. In such an example, the user may cause the wireless device 14 to execute the electronic cookbook 30 by selecting an icon for the electronic cookbook 30 displayed on the wireless device 14.

Once executed by the wireless device 14, the electronic cookbook 30 may display content associated with cooking. The user may navigate through the electronic cookbook 30 in order to select a particular cooking recipe to be used to cook a food item. The user may navigate through the electronic cookbook 30 in any manner. For example, the user may utilize a search function of the electronic cookbook 30 to search for a particular cooking recipe. As another example, the user may have stored favorite cooking recipes in a particular section of the electronic cookbook 30. In such an example, the user may navigate to that section (such as by clicking on the "favorites" tab in the electronic cookbook 30) in order to select a particular cooking recipe. As a further example, the electronic cookbook 30 may include suggested recipes and/or recipes that have been rated by other users or by celebrity chefs. As another example, the user may scroll through all (or a portion) of the cooking recipes to select a particular recipe.

Once a particular recipe (such as a recipe for chili, for example) has been selected, the electronic cookbook 30 may display on the wireless device 14 the cooking recipe associated with the selected food item. The electronic cookbook 30 may display the entire cooking recipe on the wireless device 14, or only a portion of the cooking recipe on the wireless device 14. The cooking recipe may include any information that may be utilized in cooking the food item, such as steps (or stages) for preparing the food item, a list of ingredients for the food item, a list of quantities of ingredients for the food item, a list of substitute ingredients for the food item, a list of devices or appliances that may be used to cook the food item (such as a description and/or picture of a particular pot/pan, a description and/or picture of a particular type of appliance (such as an oven or grill) that should be used to cook the food item, etc.), any other information associated with the food item, or any combination of the preceding. The cooking recipe may also include instructional videos associated with cooking the food item and/or pictures associated with ingredients of the food item (such as a picture of an onion, a picture of a diced onion, a picture of what an onion looks like after being caramelized, etc.).

The electronic cookbook 30 may further include a step-by-step guide for cooking the food item in accordance with the cooking recipe. This step-by-step guide may navigate the user through each step in the cooking process. For example, the cooking recipe for chili may include the following steps: (1) meat is added to the pot and browned at a particular temperature (such as 375° F.) for a particular duration of time (such as 10 minutes); (2) onions and or other ingredients are added to the browned meat; (3) this combination of ingredients is cooked at a second particular temperature (such as 300° F.) for a second particular duration of time (such as 5 minutes); (4) tomatoes, tomato sauce, and spices are added; (5) this combination of ingredients is cooked at a third particular temperature (such as 212° F.) for a third particular duration (till the tomato sauce combination is reduced by ½); and (6) the entire food item is cooked at a fourth temperature (such as 180° F.) for a fourth particular duration of time (such as 4 hours).

In the step-by-step guide, each of the above example steps for chili may be displayed individually (or individually highlighted in the cooking recipe to identify the current step). For a current step, the wireless device 14 may display information that explains the current step in the cooking recipe, and further explains what the user is supposed to do during that step. Once the step has been completed, the user may be prompted to indicate that the step has been completed, such as by clicking on a "next" button displayed on the wireless device 14. This may allow the user to navigate to the next step. The user may click on a button of the wireless device 14 or the screen of the wireless device 14 to activate such a "next" button. Additionally (or alternatively), the user may click on any other button (or control device) to navigate through the steps (or stages).

The step-by-step guide may further include additional information associated with cooking the food item. For example, if the first step for cooking chili is to add meat to a cooking device 86 (such as a 5 quart pot), the first step in the step-by-step guide may include pictures of the recommended cooking device 86, pictures of the recommended heat source 50 (such as a burner) that should be used to cook the meat, nutritional information associated with the meat, information about the type of animal that the meat comes from, instructional videos on how to handle the meat, instructional videos and/or other information associated with sanitizing your hands after touching the meat, other information associated with the particular step, or any combination of the preceding.

Following the selection of a particular cooking recipe (such as chili), the wireless device 14 may prompt the user to select which heat source system 46 and which cooking device system 82 the user will use to cook the food item. The wireless device 14 may prompt the user to select the heat source system 46 and cooking device system 82 by displaying descriptions and/or pictures of various heat source systems 46 and cooking device systems 82 that may be proper for a particular recipe. For example, if the recipe recommends that the user use a burner to cook the chili, the wireless device 14 may prompt the user to select which burner on a grill or stovetop (such as the front left burner of the stovetop) they intend to use to cook the chili. As another example, if the recipe recommends that the user use either a 5 quart pot or a 10 quart pot to cook the chili, the wireless device 14 may prompt the user to select which of the 5 quart pot or a 10 quart pot they intend to use to cook the chili.

In order to display descriptions and/or pictures of heat source systems 46 and/or cooking device systems 82, the wireless device 14 (and electronic cookbook 30) may receive information about each heat source system 46 and/or cooking device system 82 that is available for use in a particular kitchen. The information may be received in any manner. For example, the heat source systems 46 and cooking device systems 82 may have been pre-registered with the wireless device 14 and the electronic cookbook 30 when the heat source systems 46 and/or cooking device systems 82 are purchased. Such pre-registration may allow the wireless device 14 to know that they are available (e.g., to know that they are available in that particular kitchen). As another example, the wireless device 14 may communicate with the heat source systems 46 and cooking device systems 82 to know that they are available. In such an example, the heat source systems 46 and cooking device systems 82 may broadcast advertisement packets (such as BLUETOOTH advertisement packets) that advertise the heat source systems 46 and cooking device systems 82. This may allow the wireless device 14 to know which heat source systems 46 and cooking device systems 82 are available in the kitchen. The wireless device 14 may also use the strength of broadcast signals from heat source systems 46 and cooking device systems 82 to determine which are nearby. Wireless device 14 may also use technology such as Near Field Communication (NFC) to determine which heat source systems 46 and cooking device systems 82 are nearby. In some examples, heat source system 46 may use any of the above techniques to discover which cooking device systems 82 are in its vicinity, and may further communicate that information to wireless device 14. In other examples, cooking device system 82 may use any of the above techniques to discover which heat source systems 46 are in its vicinity, and may further communicate that information to wireless device 14.

Instead of (or in addition to) prompting a user to select which heat source system 46 and cooking device system 82 that will be used to cook the food item, the wireless device 14 may instruct the user to use a particular heat source system 46 and/or cooking device system 82. For example, the wireless device 14 may analyze the cooking recipe to determine what heat source system 46 and cooking device system 82 are acceptable for the recipe. Furthermore, the wireless device 14 may further determine what heat source systems 46 and cooking device systems 82 are available in a kitchen. Based on these determinations, the wireless device 14 may compare the results to determine the best fit for the particular recipe. Additionally, the wireless device 14 may show the user a description and/or picture of which heat source system 46 and/or cooking device system 82 to use.

The wireless device 14 may also send a signal to the heat source system 46 and/or cooking device system 82 to help the user locate the recommended heat source system 46 and/or cooking device system 82. This signal may cause the recommended heat source system 46 and/or cooking device system 82 to provide an indication (such as a visual indication and/or an audible indication) to the user. To provide the indication, the heat source system 46 and/or cooking device system 82 may include a lighting system that may light up (or blink), a speaker system that may emit the audible sound, any other indication system, or any combination of the preceding. The indication(s) may assist the user in determining which heat source system 46 and/or cooking device system 82 to use.

Following the selection of a particular heat source system 46, the wireless device 14 may establish a first communication link with the selected heat source system 46. The first communication link, for example, may be with the front left gas burner of a stovetop or may be a common or single communication link through which the communication link is shared among the various burners of a multi-burner stovetop. This communication link may be established over network 38, as is illustrated in FIG. 1B. The wireless device 14 may establish any type of communication link with the heat source system 46, and may establish the communication link in any manner. As an example, the wireless device 14 may establish a WPAN communication link (e.g., a BLUETOOTH communication link, a WI-FI communication link), an infrared communication link, a cellular communication link, any other wireless communication link, or any combination of the preceding. Additionally, the wireless device 14 may establish the communication link in any manner. For example, the wireless device 14 may establish the communication link by sending a request for a communication link to another device, accepting another device's request for a communication link, responding to an advertisement or any other transmittal, sending an advertisement or any other transmittal, any other manner of establishing a communication link, or any combination of the preceding.

As is illustrated in FIG. 1B, the wireless device 14 establishes a BLUETOOTH communication link with the heat source system 46. The communication link may be any type of BLUETOOTH communication link. For example, the communication link may be a 1:1 BLUETOOTH link, where the wireless device 14 operates as the central device, and the heat source system 46 operates as the peripheral device.

Following the selection of a particular cooking device system 82, the heat source system 46 may establish a second communication link with the selected cooking device system 82. This second communication link may be established over network 78, as is illustrated in FIG. 1B. The heat source system 46 may establish any type of communication link with the cooking device system 82. As an example, the heat source system 46 may establish a WPAN communication link (e.g., a BLUETOOTH communication link, a WI-FI communication link), an infrared communication link, a cellular communication link, any other wireless communication link, a wired communication link (such as when the cooking device system 82 is a cooking pan that is in a physical connection with a heat source system 46 that is a rice cooker or a slow cooker), or any combination of the preceding. Additionally, the heat source system 46 may establish the communication link in any manner. For example, the heat source system 46 may establish the communication link by sending a request for a communication link to another device, accepting another device's request for a communication link, responding to an advertisement or any other transmittal, sending an advertisement or any other transmittal, any other manner of establishing a communication link, or any combination of the preceding.

The second communication link (in-between the heat source system 46 and the cooking device system 82) may be the same type of communication link as the first communication link (in-between the wireless device 14 and the heat source system 46). For example, both the second communication link and the first communication may be BLUETOOTH communication links. As another example, the second communication link and the first communication link may be different types of communication links. For example, the second communication link may be a wired communication link and the first communication link may be a BLUETOOTH communication link or a WI-FI communication link.

As illustrated in FIG. 1B, the second communication link between the heat source system 46 and the cooking device system 82 is a BLUETOOTH communication link. The second communication link may be any type of BLUETOOTH communication link, and the second communication link may be established in any way.

For example, the second communication link may be a communication link where the heat source system 46 receives BLUETOOTH advertisement packets from the cooking device system 82, and the heat source system 46 then uses the BLUETOOTH advertisement packets to request BLUETOOTH scan response packets (or other types of packets) from the cooking device system 82. The heat source system 46 may establish such a second communication link in any manner. For example, the heat source system 46 may establish this communication link based on information received from the wireless device 14. In such an example, the wireless device 14 may obtain the BLUETOOTH unique identifier for the cooking device system 82 from the BLUETOOTH advertisement packets broadcasted by the cooking device system 82. The wireless device 14 may then transmit this BLUETOOTH unique identifier for the cooking device system 82 to the heat source system 46. The heat source system 46 may use this BLUETOOTH unique identifier to filter out or ignore any other BLUETOOTH advertisement packets (or other advertisement packets), other than those broadcasted by the cooking device system 82. Additionally, when the heat source system 46 receives a BLUETOOTH advertisement packet from the cooking device system 82, the heat source system 46 may use an identifier in the BLUETOOTH advertisement packet to request BLUETOOTH scan response packets (or other types of packets) from the cooking device system 82.

In another example, the second communication link may be a communication link where the cooking device system 82 obtains the BLUETOOTH unique identifier of the heat source system 46, and then the cooking device system 82 may use this BLUETOOTH unique identifier to send packets (such as scan response packets) directly to the heat source system 46. In such an example, cooking device system 82 may obtain the BLUETOOTH unique identifier of the heat source system 46 from the wireless device 14. For example, the wireless device 14 may obtain the BLUETOOTH unique identifier for the heat source system 46 from the BLUETOOTH advertisement packets broadcasted by the heat source system 46 (or from the 1:1 BLUETOOTH connection with the heat source system 46), and then the wireless device 14 may transmit this BLUETOOTH unique identifier for the heat source system 46 to the cooking device system 82. The cooking device system 82 may then use this BLUETOOTH unique identifier to send packets (such as scan response packets) directly to the heat source system 46, for example.

Following the selection of a particular cooking device system 82, the wireless device 14 may also establish a third communication link with the selected cooking device system 82. This third communication link may be established over network 42, as is illustrated in FIG. 1B. The wireless device 14 may establish any type of communication link with the cooking device system 82. As an example, the wireless device 14 may establish a WPAN communication link (e.g., a BLUETOOTH communication link, a WI-FI communication link), an infrared communication link, a cellular communication link, any other wireless communication link, or any combination of the preceding. Additionally, the wireless device 14 may establish the communication link in any manner. For example, the wireless device 14 may establish the communication link by sending a request for a communication link to another device, accepting another device's request for a communication link, responding to an advertisement or any other transmittal, sending an advertisement or any other transmittal, any other manner of establishing a communication link, or any combination of the preceding.

The third communication link (in-between the wireless device 14 and the cooking device system 82) may be the same type of communication link as the second communication link (in-between the heat source system 46 and the cooking device system 82) and the first communication link (in-between the wireless device 14 and the heat source system 46). For example, each of the third communication link, the second communication link, and the first communication link may be a BLUETOOTH communication link. As another example, the third communication link may be a different type of communication link than the second communication link and/or the first communication link. For example, the third communication link may be a WI-FI communication link, the second communication link may be a wired communication link, and the first communication link may be a BLUETOOTH communication link.

Figure 2:
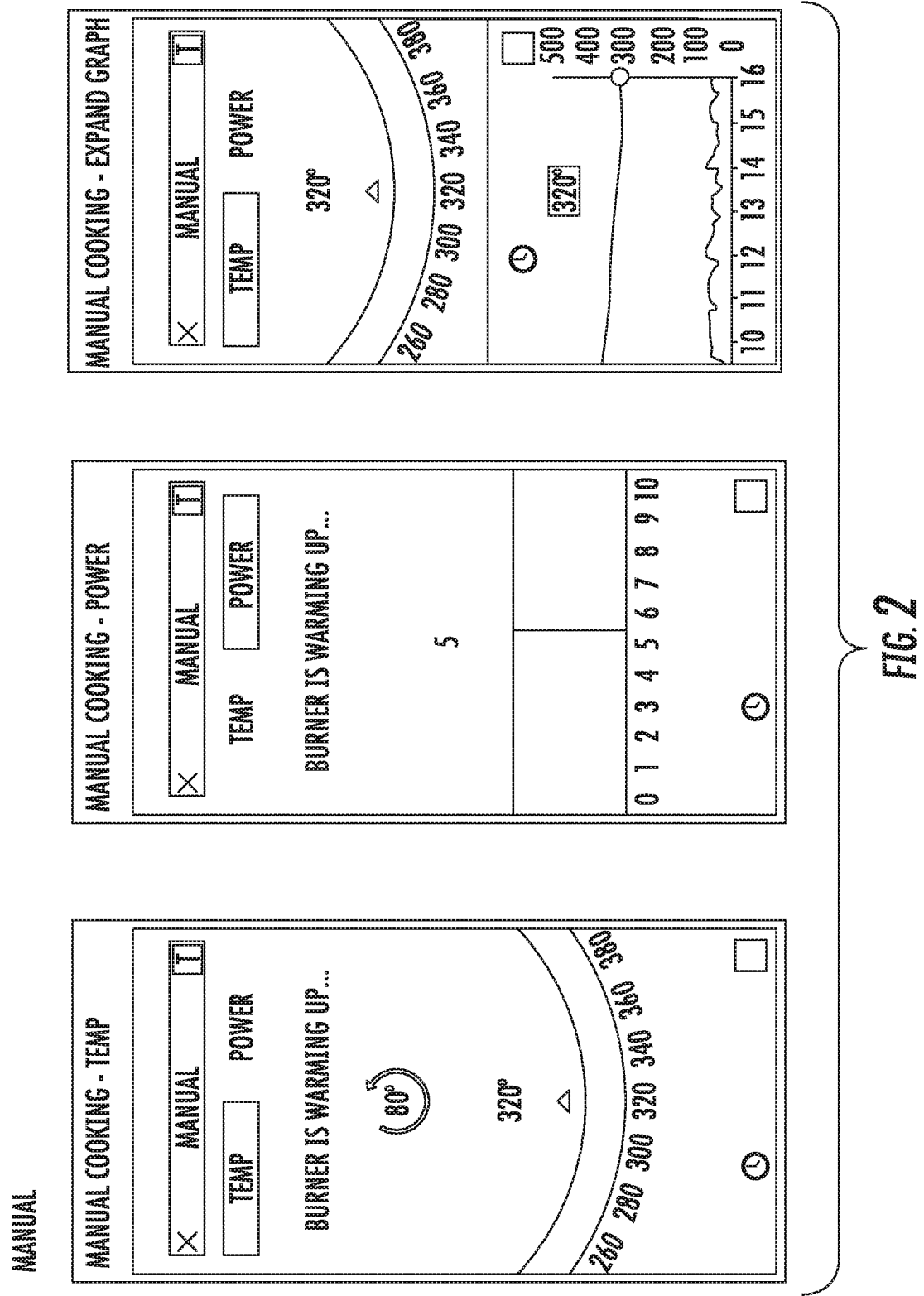
FIGS. 2-8 illustrate example screenshots displayed by an electronic cookbook on a device.
Figure 3:
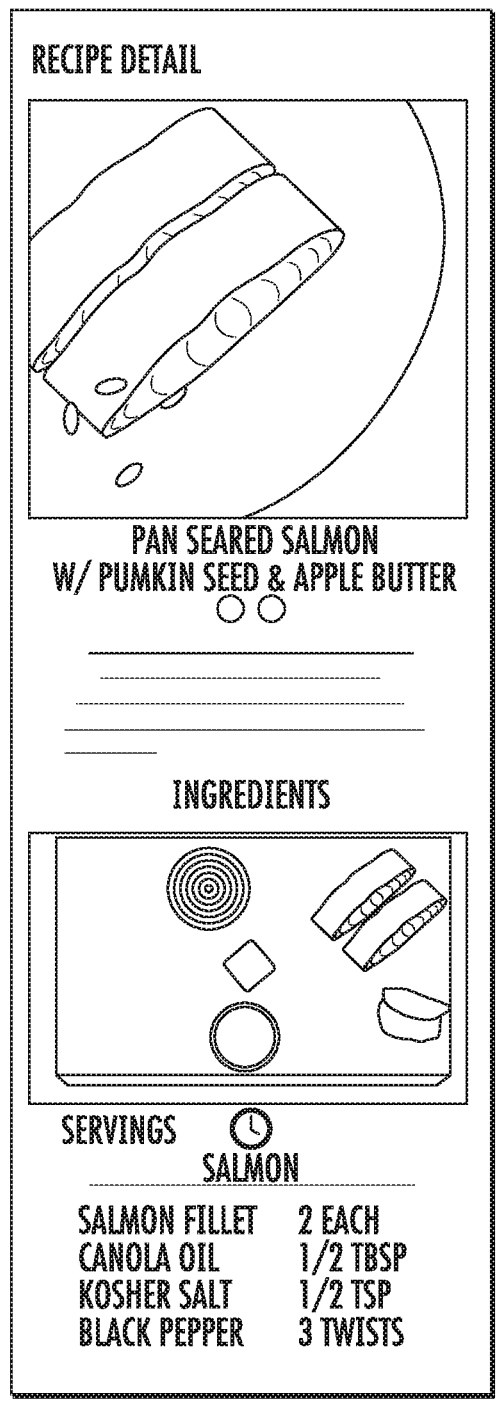
Figure 4:
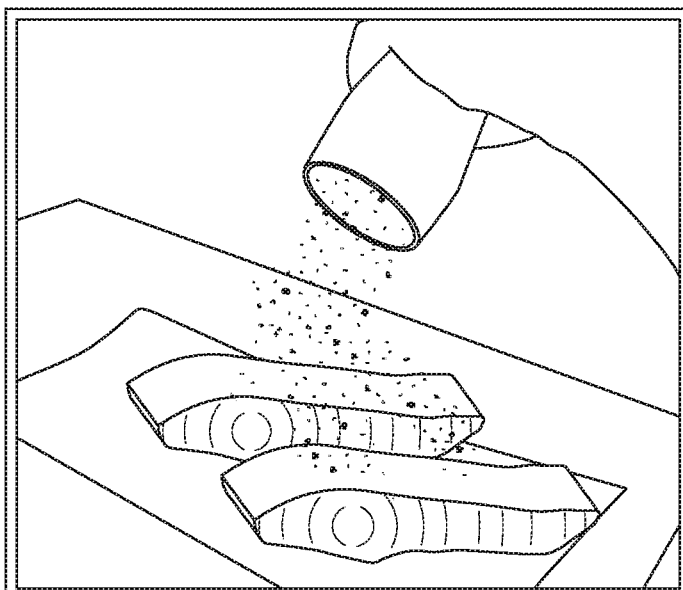
Figure 5:
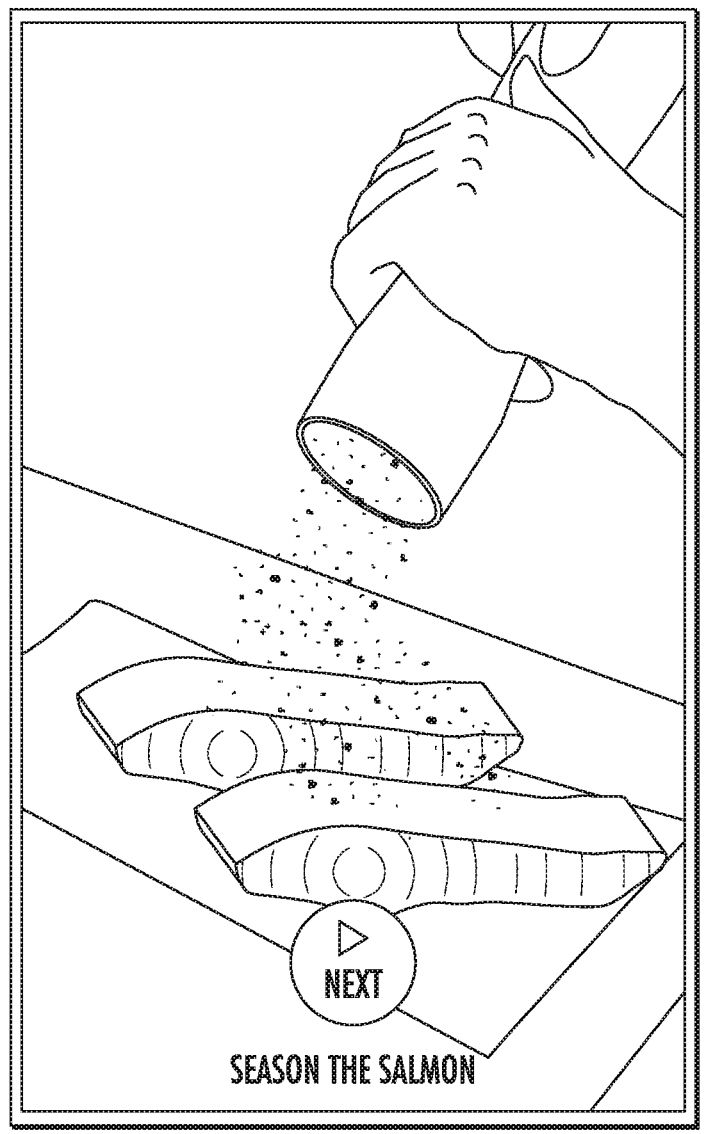
Figure 6:
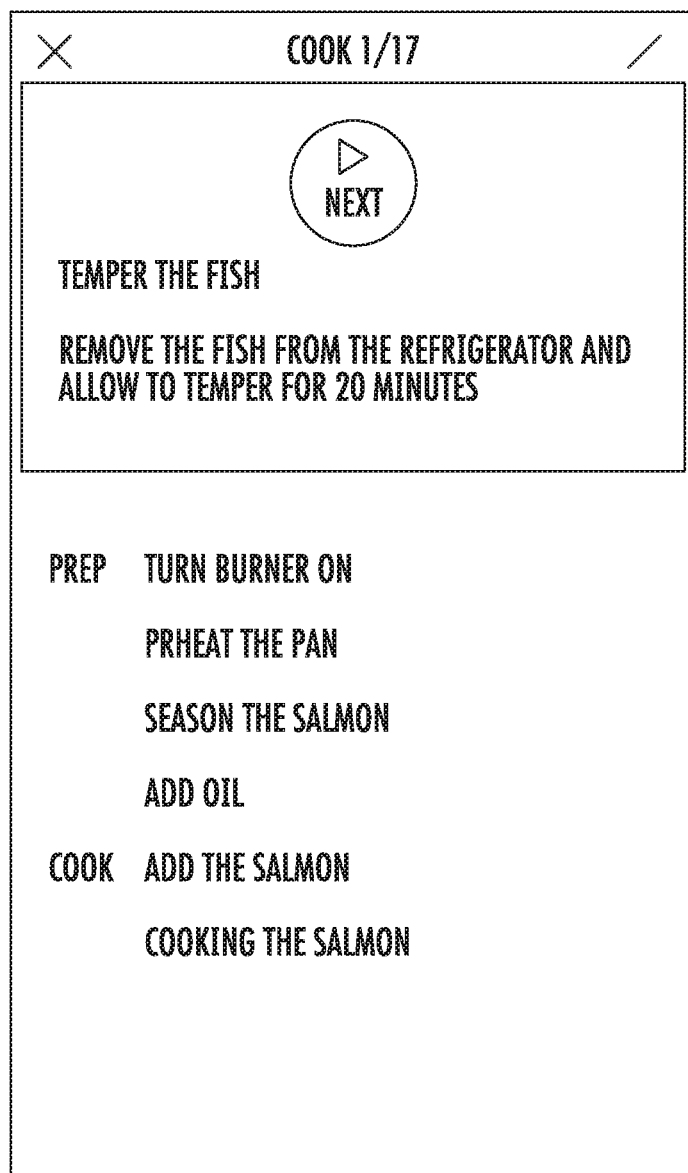
Figure 7:
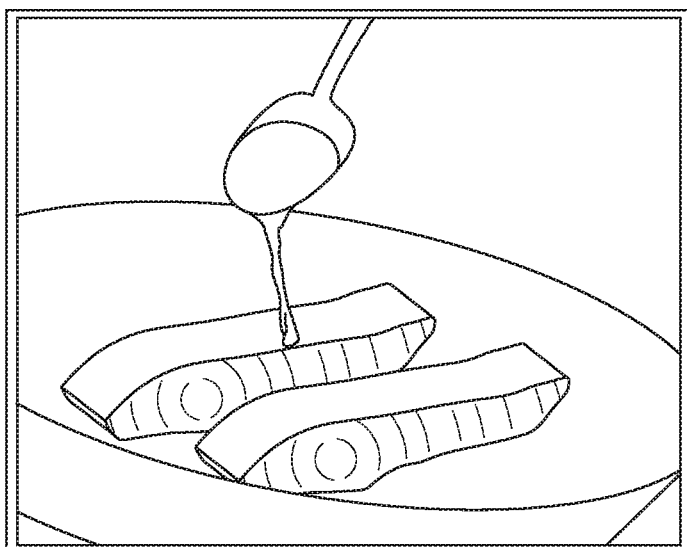
Figure 8:
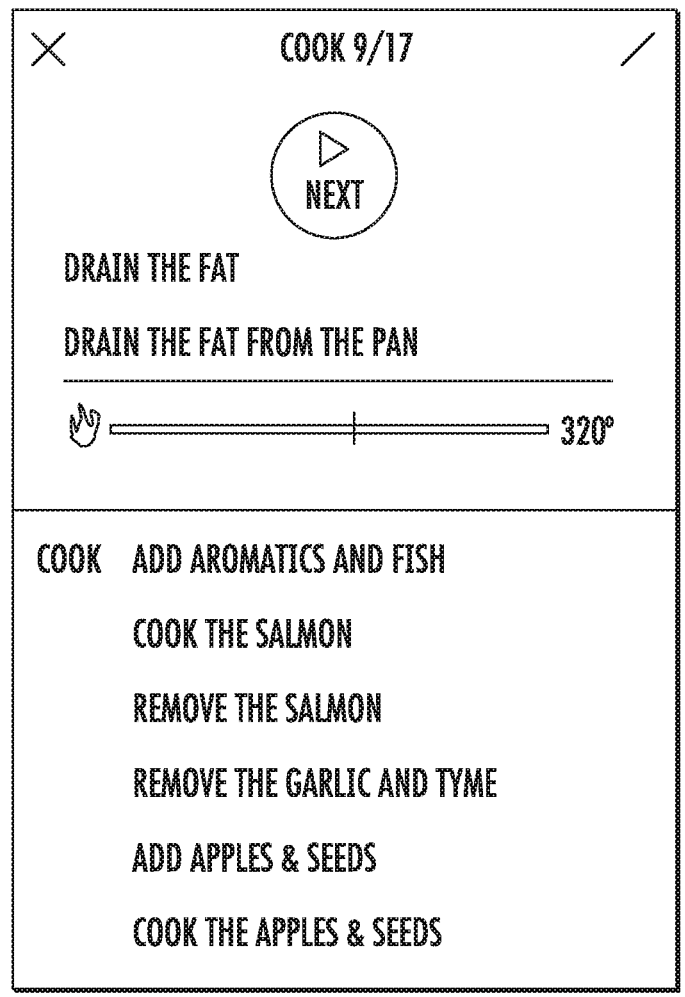

As is illustrated in FIG. 1B, the third communication link between the wireless device 14 and the cooking device system 82 is a BLUETOOTH communication link. The third communication link may be any type of BLUETOOTH communication link. For example, the third communication link may be a communication link where the wireless device 14 receives BLUETOOTH advertisement packets from the cooking device system 82, and the wireless device 14 uses the BLUETOOTH advertisement packets to request BLUETOOTH scan response packets (or other types of packets) from the cooking device system 82. This may allow the wireless device 14 to receive measurement information 74, and display such measurement information 74 to the user on the display of the wireless device 14. For example, the wireless device 14 may receive an indication of the current temperature associated with the food item, and may display a graphical representation of this current temperature associated with the food item (e.g., a graphical representation of 375° F.). Examples of the graphical representations that may be displayed by the wireless device 14 are seen in FIG. 2, and include the current temperature associated with the food item, the amount of energy being provided by the heat source 50, and/or any other information associated with the cooking of the food item. In some examples, the use of BLUETOOTH scan request and scan response packets, or similar broadcast packets may obviate the need for the cooking device system 82 and the wireless device 14 to have a 1:1 communication link.

Following the establishment of the first communication link between the wireless device 14 and the heat source system 46, the wireless device 14 may transmit cooking instructions 70 to the heat source system 46. The cooking instructions 70 may include any information associated with cooking the food item. For example, the cooking instructions 70 may include temperatures that a food item is to be cooked at and/or durations of time that the food item is to be cooked at the particular temperatures. Additionally, the cooking instructions 70 may include ingredients that are to be added to food item, steps that are to be performed by a user to cook the food item, any other information associated with cooking the food item, or any combination of the preceding.

The cooking instructions 70 may include information for an entire recipe, or may include information for only a portion of the recipe. For example, the cooking instructions 70 may only include information for a particular step in a step-by-step guide for cooking a food item. In such an example, when a particular step is finished, additional cooking instructions 70 may be sent to the heat source system 46. These additional cooking instructions 70 may include information for the next step. As another example, the cooking instructions 70 may include information for two or more particular steps in a step-by-step guide for cooking a food. These cooking instructions 70 may also be supplemented with additional cooking instructions 70 (if needed) as the user progresses through the cooking recipe.

As is illustrated, the cooking instructions 70 include at least an indication of a temperature, and an indication of a duration of time, for at least one of the steps of the cooking recipe. The indication may be data (or other information) that may allow the heat source system 46 to determine the temperature and/or the duration of time. For example, the indication may be the temperature itself (e.g., 375° F.) and/or the duration of time itself (e.g., 10 minutes), or it may be a signal or pointer (or any other type of data) that may be used by the heat source system 46 to determine the temperature and/or the duration of time. In the example discussed above with regard to a cooking recipe for chili, the cooking instructions 70 may include information associated with the first step of the cooking recipe (which provides for browning the meat at 375° F. for a duration of 10 minutes). As such, the cooking instructions 70 may include an indication of a temperature (e.g., 375° F.) and an indication of a duration of time (e.g., 10 minutes) for the first step.

Although the cooking instructions 70 have been described above as being received from the wireless device 14 through the first communication link, in some examples, the wireless device 14 may utilize an intermediary device to provide the cooking instructions 70. For example, if the first communication link (in-between the wireless device 14 and the heat source system 46) fails (or if a back-up set of the information is desired), the wireless device 14 may send the cooking instructions 70 to the heat source system 46 through the intermediary device (such as another wireless device 14, or the cooking device system 82).

Based on receiving the cooking instructions 70 (which may include an indication of a 375° F. temperature and an indication of a 10 minute duration of time), the heat source system 46 (via the processor 58, for example) may activate the heat source 50, so as to begin providing energy to the cooking device 86 of the cooking device system 82. Alternatively, if the heat source 50 is already activated, the heat source system 46 (via the processor 58, for example) may adjust the amount of energy being provided by the heat source 50 to the cooking device 86.

The amount of energy provided by the heat source 50 may also be based on the type of cooking device system 82 that is being used to cook the food item. For example, the heat source system 46 may store (or access) a profile associated with the particular cooking device system 82. Such a profile may include a type of cooking device 86 (e.g., a pot), of volume of the cooking device 86 (e.g., 5 quarts), a material type of the cooking device 86 (e.g., copper bottom), any other information associated with the cooking device 86 of the cooking device system 82, or any combination of the preceding. Using this profile, the heat source system 46 may adjust the amount of energy provided to the cooking device 86 by the heat source 50. For example, if the cooking device 86 is made of a material that heats to a higher temperature with a lower amount of energy, the heat source system 46 (via the processor 58, for example) may adjust the amount of energy provided to the cooking device 86 in accordance with such a profile.

While the heat source 50 is providing energy to the cooking device 86 in accordance with the cooking instructions 70, the heat source system 46 may receive information from the cooking device system 82 that may assist the heat source system 46 in cooking the food item. As is discussed above, the cooking device system 82 may include measurement sensors 90 that may measure or sense (or otherwise provide) a measurement associated with the food item. For example, the measurement sensors 90 may measure a current temperature associated with the food item (such as a current temperature of a food item, a current temperature of a portion of the cooking device 86 adjacent the food item, or a current temperature that the food item is being cooked at). Based on the measurements from the measurement sensors 90, the cooking device system 82 may transmit measurement information 74 to the heat source system 46 using the second communication link.

The measurement information 74 may include any information that may be measured using the measurement sensors 90. For example the measurement information 74 may include an indication of the current temperature that the food item is being cooked at. This indication may be data (or other information) that may allow the heat source system 46 to determine the current temperature that the food item is being cooked at. For example, the indication may be the current temperature itself (e.g., 375° F.) or may be a signal or pointer (or any other type of data) that may be used by the heat source system 46 to determine that the current temperature is 375° F. Additionally (or alternatively), the measurement information may include an indication of the current liquid level of the food item, or an indication of any other measurable information associated with cooking the food item.

The heat source system 46 may use the measurement information 74 to check (continuously or periodically) the amount of energy being applied to the cooking device 86. For example, if the heat source 50 is providing an amount of energy that is intended to cook the food item at 375° F., but the measurement information 74 indicates that the food is being cooked at a temperature of 350° F., the heat source system 46 may increase the amount of energy being applied to the cooking device 86. As another example, if the heat source 50 is providing an amount of energy that is intended to cook the food item at 375° F., but the measurement information 74 indicates that the food is being cooked at a temperature of 400° F., the heat source system 46 may decrease the amount of energy being applied to the cooking device 86. As a further example, if the heat source system 46 is providing an amount of energy that is intended to cook the food item at 375° F., and the measurement information indicates that the food is being cooked at a temperature of 375° F., the heat source system 46 may allow the heat source 50 to continue to provide the same amount of energy to the cooking device 86. As a further example, if the measurement information 74 indicates that the current cooking temperature is below the intended temperature of 375° F. but rising rapidly in such a manner that it is likely to overshoot the intended temperature, the heat source system 46 may decrease the amount of energy provided by the heat source 50. As a further example, the heat source system 46 may make any of a variety of adjustments to the amount of energy provided by the heat source 50 based on the operation of a feedback or feedforward algorithm (for example a PID algorithm) on a series of temperature measurements 74. Example PID algorithms for use in cooking are described in U.S. Pat. No. 8,692,162 entitled "Oven control utilizing data-driven logic", and U.S. Pat. No. 8,800,542 entitled "Automatic temperature control device for solid fuel fired food cooker," both of which are incorporated herein by reference.

The heat source system 46 may further use the measurement information 74 to check (continuously or periodically) for potential errors in the cooking process. For example, a user may have positioned the wrong cooking device system 82 on the heat source 50. In such an example, the heat source system 46 may utilize the measurement information 74 and a profile of the correct cooking device system 82 to determine that the wrong cooking device system 82 is currently positioned on the heat source 50. In particular, the profile for the correct cooking device system 82 may indicate that a particular amount of energy (such as a medium-high level) applied to the correct cooking device 86 should cause the food item to be cooked at a particular temperature (such as 375° F.). However, if the wrong cooking device system 82 is positioned on the heat source 50, the measurement information 74 received from the correct cooking device system 82 may indicate that the current temperature is too low for the amount of energy being provided by the heat source 50. Based on this, the heat source system 46 may determine that the wrong cooking device system 82 is positioned on the heat source 50. The heat source system 46 may then send an error signal to the wireless device 14, which may alert the user to the error. Such an error correction system may be particularly advantageous when multiple heat sources 50 are being used to apply energy to multiple cooking devices 86 so as to cook multiple different types of food items at similar (or identical) time periods. A heat source 50 could also determine which cooking device system 82 is positioned on top of or in it for cooking purposes by analyzing the strength of any wireless signals coming from the various cooking device systems 82 in vicinity of the heat source 50. Additional details regarding these determinations are discussed below.

As further examples, the heat source system 46 may be able to use the measurement information 74 to determine that the wrong ingredients have been added to the cooking device system 82 (such as if the acidity of the food item is incorrect), that too much (or too little) of a particular ingredient has been added to the cooking device system 82 (such as if the amount of weight in the cooking device 86 is too high (or too low)), that the cooking device 86 is too full (or too empty), that the food item is boiling (or any other phase change is occurring), that the food item is about to boil over, that the food item has completely boiled away, that the acidity of the food item is incorrect, that the food item is heating improperly, that the food item has reached the desired texture (such as crispy) or doneness, that the lid of the cooking device 86 has been left off of the cooking device 86 (or left on the cooking device 86), any other information associated with an error in the cooking process, or any combination of the preceding.

As is discussed above, the cooking device system 82 may provide measurement information 74 to the heat source system 46. The cooking device system 82 may provide the measurement information 74 in any manner. For example, the cooking device system 82 may transmit the measurement information 74 using a BLUETOOTH communication link. To do so, the cooking device system 82 may periodically transmit BLUETOOTH advertisement packets that may identify the cooking device system 82. When the heat source system 46 receives such a BLUETOOTH advertisement packet, the heat source system 46 may request additional information from the cooking device system 82. In response to this request, the cooking device system 82 may activate one or more of the measurement sensors 90 so as to begin receiving measurements from the measurement sensors 90. Based on these measurements, the cooking device system 82 may create measurement information 74, and insert this measurement information 74 into a BLUETOOTH scan response packet (or any other type of BLUETOOTH packet). The measurement information 74 may be added into any suitable field in the BLUETOOTH scan response packet, such as a special field reserved for manufacturer-specific advertising data. The BLUETOOTH scan response packet may then be broadcast (or otherwise sent) to the heat source system 46 that requested the additional information. In some examples, each time a BLUETOOTH scan response packet is constructed, the most current measurement information 74 may be embedded in the BLUETOOTH scan response packet.

Typically, a BLUETOOTH scan response packet is a packet used by a peripheral device to provide more information than fits in a BLUETOOTH advertisement packet. This additional information may tell a device examining the advertisement and scan response packets about the services the peripheral provides, the name of the peripheral, and related information the receiver of the advertisement packet might want to know to determine whether it wants to connect with the peripheral. Unlike traditional BLUETOOTH scan response packets (whose content is always the same), the BLUETOOTH scan response packets created by the cooking device system 82 may have content that changes in-between successive BLUETOOTH scan response packets, as each BLUETOOTH scan response packet may include the most current measurement information 74 (which can change over time). Additional information regarding advertisement packets and/or scan response packets (or scanning packets) is discussed in the following documents, all of which are incorporated herein by reference: U.S. Patent Application Publication No. 2013/0003630 entitled "Connection Setup for Low Energy Wireless Networks Based on Scan Window and Scan Interval Estimation"; U.S. Patent Application Publication No. 2014/0321321 entitled "Method and Technical Equipment for Short Range Data Transmission"; U.S. Patent Application Publication No. 2015/0172391 entitled "Method, Apparatus, and Computer Program Product for Network Discovery"; U.S. Patent Application Publication No. 2015/0172902 entitled "Method, Apparatus, and Computer Program Product for Service Discovery in Wireless Short-Range Communication"; U.S. Patent Application Publication No. 2016/0029149 entitled "Low Power Consumption Short Range Wireless Communication System"; U.S. Pat. No. 6,795,421 entitled "Short-Range RF Access Point Design Enabling Services to Master and Slave Mobile Devices"; U.S. Pat. No. 7,602,754 entitled "Short-Range RF Access Point Design Enabling Services to Master and Slave Mobile Devices"; U.S. Pat. No. 8,588,688 entitled "Non-Networked Messaging"; U.S. Pat. No. 8,737,917 entitled "Method and System for a Dual-Mode BLUETOOTH Low Energy Device"; U.S. Pat. No. 8,817,717 entitled "Concurrent Background Spectral Scanning for BLUETOOTH Packets While Receiving WLAN Packets"; U.S. Pat. No. 9,185,652 entitled "BLUETOOTH Low Energy Module Systems and Methods"; U.S. Pat. No. 9,258,695 entitled "Method, Apparatus, and Computer Program Product for Service Discovery in Short-Range Communication Environment"; U.S. Pat. No. 9,357,342 entitled "Short-Range Wireless Controller Filtering and Reporting"; U.S. Pat. No. 9,414,217 entitled "Method and Technical Equipment for Short Range Data Transmission"; U.S. Pat. No. 9,456,295 entitled "Method and Apparatus for Receiving Content Based on Status of Terminal"; U.S. Pat. No. 9,538,356 entitled "Method and Apparatus for BLUETOOTH-Based General Service Discovery"; and U.S. Pat. No. 9,544,755 entitled "Method, Apparatus, and Computer Program Product for Non-Scannable Device Discovery".

In some examples, these steps may allow the cooking device system 82 to conserve its power source (such as a battery), allowing the power source to last longer. For example, by utilizing BLUETOOTH scan response packets to transmit information, in some examples, the cooking device system 82 may be able to transmit current measurement information 74 (e.g., current temperature data) without the computational and battery-life-limiting overhead associated with establishing and maintaining a formal BLUETOOTH connection. As another example, the cooking device system 82 may only utilize its measurement sensors 90 when additional information is requested. This may allow the measurement sensors 90 to remain dormant for long periods of time (such as when the cooking device system 82 is not being used at all), and reduce the amount of energy being used by the cooking device system 82. In other examples, the cooking device system 82 may constantly be using its measurement sensors 90 or using its measurement sensors 90 during a period when the user turns on the cooking device system 82 (such as by pressing a power button). In such examples, the cooking device system 82 may transmit measurement information 74 any time the measurement sensors 90 are activated, or only when the measurement information 74 is requested.

Although the steps discussed above have been described in relation to a BLUETOOTH communication link, such steps (or similar steps) may be performed for any other communication link, such as any other WPAN communication link (e.g., BLUETOOTH low power, BLUETOOTH 5, ANT+, Zigbee (IEEE 802.15.4), other IEEE 802.15 protocols, IEEE 802.11 A, B or G without limitation, or WI-FI (IEEE 802.11)), a cellular communication link, an infrared communication link, any other wireless communication link, any other communication link, or any combination of the preceding. Additionally, although the measurement information 74 has been described above as being sent to the heat source system 46 (using the second communication link), the measurement information 74 may also be sent to the wireless device 14 (using the third communication link). In such examples, the wireless device 14 may request the additional information after also receiving an advertisement packet (as is discussed above). By receiving the measurement information 74, the wireless device 14 may be able to display the information included in the measurement information 74 (such as the current temperature associated with the food item) to the user. The wireless device 14 may also be able to provide this information to the heat source system 46 if the second communication link (in-between the heat source system 46 and the cooking device system 82) fails (or if a back-up set of the information is desired), and/or the heat source system 46 may be able to provide this information to the wireless device 14 if the third communication link (in-between the wireless device 14 and the cooking device system 82) fails (or if a back-up set of the information is desired).

While the heat source 50 is providing energy to the cooking device 86 in accordance with the cooking instructions 70, the heat source system 46 may further keep track of the amount of time that the energy has been provided to the cooking device 86. This may allow the heat source system 46 to cook the food item at a particular temperature for a particular amount of time. For example, as is discussed above, the cooking instructions 70 may indicate that the food item is to be cooked at 375° for 10 minutes. In such an example, the heat source system 46 may keep track of the amount of time that it has been providing energy to the cooking device 86 for that particular step. When the duration of time has elapsed (or when the duration of time is close to lapsing, such as five minutes before lapsing, two minutes before lapsing, and/or one minute before lapsing), the heat source system 46 may send a signal to the wireless device 14 indicating that the duration of time has lapsed (or that the duration of time is close to lapsing). This may cause the wireless device 14 to alert the user, such as by making an audible sound, vibrating, texting the user, calling the user, or any other manner of alerting the user. The alert may inform the user that it is time to move to the next step (or that it is almost time to move to the next step).

Additionally (or alternatively), the wireless device 14 may also keep track of the time that has elapsed for that particular step. As such, the wireless device 14 may be able to alert the user of the time even without receiving a signal from the heat source system 46. Furthermore, the wireless device 14 may also provide a continuous countdown (or periodic updates) of the time left in the duration of time (such as 2 minutes and 30 seconds left till the next step).

When a step of the cooking recipe has been completed (such as when the first step of browning meat at 375° F. for 10 minutes, has been completed), the wireless device 14 may move to the next step. This movement to the next step (such as step two of the cooking recipe) may cause the wireless device 14 to display the next step to the user. Alternatively, if more than one step is already being displayed by the wireless device, such movement to the next step may cause the next step to be highlighted in some manner on the display to indicate that the next step is now the current step. The movement to the next step may also cause the wireless device 14 to transmit new cooking instructions 70 to the heat source system 46. The new cooking instructions 70 may include information associated with the new step. Alternatively, if the heat source system 46 already has access to all (or more than one set) of the cooking instructions 70 for the cooking recipe, the wireless device 14 may send an instruction to the heat source system 46 to move to the next step in the cooking instructions 70.

As is discussed above with regard to the chili example, the next step (e.g., step 2) may include the user adding onions and other ingredients. In such an example, the new cooking instructions 70 may include information that indicates that the heat source system 46 should continue to provide the same cooking temperature (e.g., 375° F.) for a duration of time (e.g., 5 minutes) to allow the user time to add the onions and other ingredients.

When this next step has been completed by the user, the user may indicate to the wireless device 14 that the step has been completed, such as by clicking the "next" button in the electronic cookbook 30. Additionally (or alternatively), the heat source system 46 may attempt to determine when the step has been completed. For example, the heat source system 46 may have stored information that indicates that the addition of ingredients to the food item should cause a sudden change in the current temperature associated with the food item. In such an example, after the ingredients have been added, the heat source system 46 may receive measurement information 74 that indicates that the current temperature associated with the food item has suddenly changed in a manner that is consistent with the addition of the ingredients. Based on this, the heat source system 46 may transmit a signal to the wireless device 14, indicating that the step has been completed. This may prevent the user from having to manually indicate that the step has been completed.

Alternatively, if the user has incorrectly indicated that the step has been completed, the heat source system 46 may be able to determine that this indication is incorrect. For example, if the heat source system 46 does not receive measurement information 74 that indicates, for example, a sudden change in the current temperature that the food item is being cooked at consistent with the addition of ingredients, the heat source system 46 may be able to determine that the ingredients have not been added. As such, the heat source system 46 may transmit an error message to the wireless device 14, which may cause the wireless device 14 to alert the user to the error.

Following the completion of the step (such as the completion of step 2, where onions and other ingredients were added to the food item), the wireless device 14 may move to the next step. Similar to the previous steps, such movement may cause the next step to be displayed to the user, and may further cause new cooking instructions 70 to be transmitted to the heat source system 46. As is discussed above with regard to the chili example, the next step (e.g., step 3) may include cooking the combination of ingredients at 300° F. for a duration of 5 minutes. In such an example, the new cooking instructions 70 may include the particular temperature (e.g., 300° F.) and the particular duration of time (e.g., 5 minutes).

In such an example, the heat source system 46 may reduce the amount of energy provided to the cooking device 86 in accordance with the cooking instructions 70, thereby causing the food item to be cooked at the lower temperature of 300° F. Similar to the steps discussed above, the heat source system 46 may continue to receive measurement information 74 from the cooking device system 82, thereby allowing the heat source system 46 to check the amount of energy being provided to the cooking device 86. Additionally, the heat source system 46 may also keep track of the amount of time that has elapsed in the current step.

The activities performed by the components of the cooking system 10 (discussed above) may continue for each of the steps of the cooking recipe. Once all of the steps of the cooking recipe have been completed (e.g., when the user indicates in the electronic cookbook 30 that all steps have been completed), the wireless device 14 may transmit final cooking instructions 70 to the heat source system 46. The final cooking instructions 70 may include instructions to the heat source system 46 to shut down all energy being provided to the cooking device 86. Therefore, when all steps of the cooking recipe have been completed, the wireless device 14 may cause the heat source system 46 to automatically shut down the heat source 50, which may prevent the user from having to manually shut off the heat source 50 (or to remember to shut off the heat source 50).

Modifications, additions, and/or substitutions may be made to the cooking system 10, the components of the cooking system 10, and/or the functions of the cooking system 10 without departing from the scope of the specification. For example, the cooking system 10 may include one or more (or all) of the components, functionalities, and/or abilities described (and/or claimed) in U.S. Patent Application Publication No. 2016/0051078 entitled "Automated Cooking Control Via Enhanced Cooking Equipment," which is incorporated herein by reference.

As is discussed above, one or more of the components of a cooking system may be able to check (continuously or periodically) for potential errors in the cooking process. Such errors may include any type of error in the cooking process. As examples, such an error may include a user utilizing the wrong cooking device system 82 in the cooking process (e.g., utilizing a pot instead of a frying pan), a user utilizing the wrong heat source system 46 (e.g., utilizing an oven instead of a stove top), a user utilizing the wrong heat source 50 of a heat source system 46 (e.g., utilizing the front right burner of a stove top instead of the front left burner of the stove top), a user improperly positioning a cooking device system 82 in or on a heat source 50 (e.g., positioning the pot half on the burner and half off the burner), any other error, or any combination of the preceding.

Such errors may arise in the cooking process due to the number of options available to a user while cooking. For example, during the cooking process, a user may have access to multiple different types of cooking device systems 82 (or cooking devices 86), such as multiple pans that each have a different shape, capacity, material type, and/or cooking purpose. In such examples, the user may accidentally utilize a cooking device system 82 (or cooking device 86) that may be unsuitable (or undesirable) for a particular step in the cooking process. As another example, the cooking process may involve using multiple cooking device systems 82 (or cooking devices 86) simultaneously. As an example of this, the cooking process may involve simultaneously cooking an entrée in a first cooking device system 82 (e.g., a frying pan) and a side dish or sauce in a second cooking device system 82 (e.g., a pot). In such an example, the user may accidentally utilize the first cooking device system 82 in steps that were supposed to be performed using the second cooking device system 92 (e.g., the user may accidentally attempt to cook the sauce in the frying pan instead of the pot). As another example, the kitchen may include multiple heat source systems 46 and/or a heat source system 46 with multiple heat sources 50. As an example of this, a heat source system 46 in the kitchen may be a stove top with multiple burners. In such an example, the user may accidentally position the cooking device system 82 on the wrong burner (e.g., a burner that is not activated or a burner that is providing the wrong amount of heat).

Figure 9:
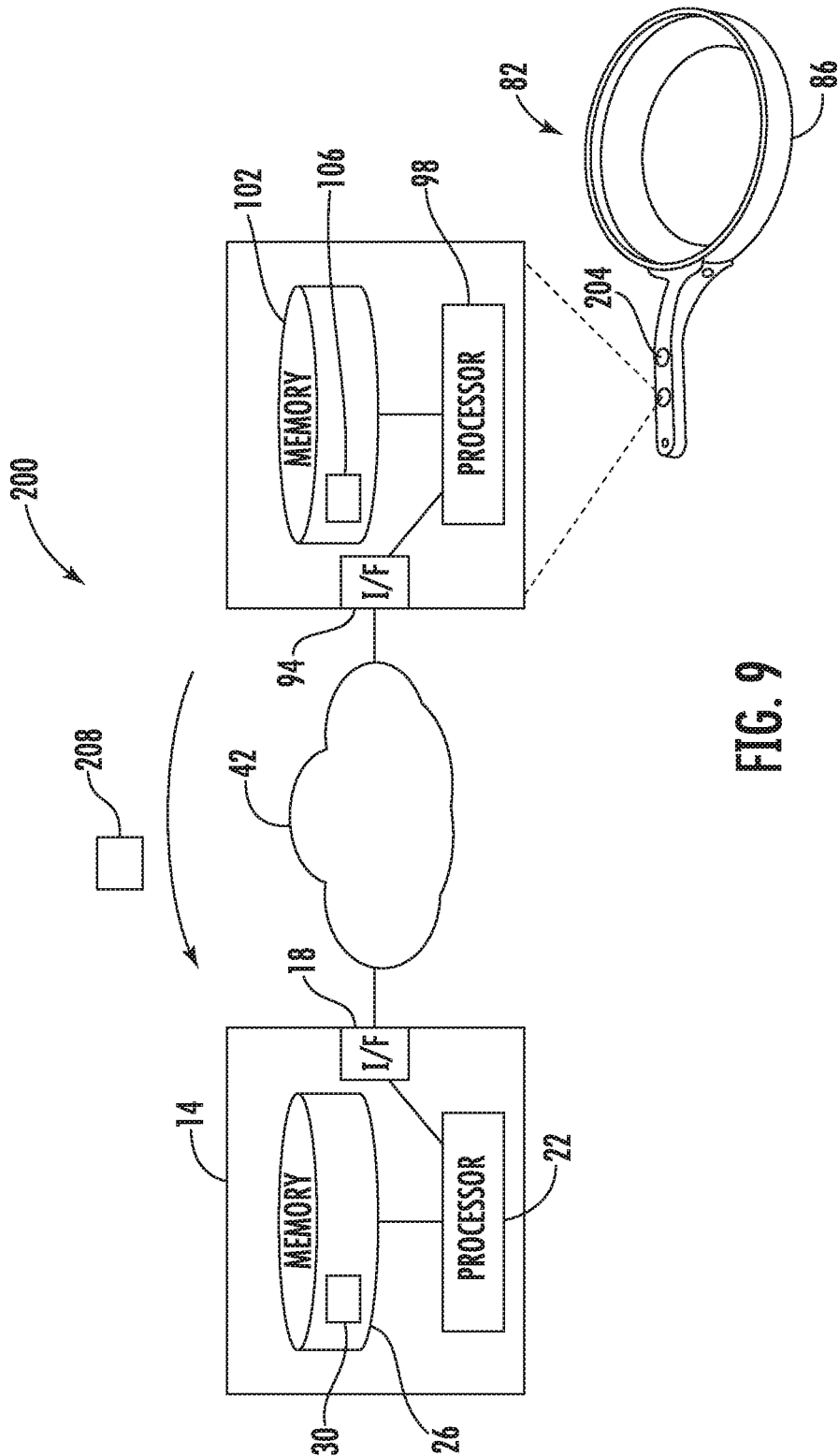
FIG. 9 illustrates an example cooking system that may assist a user in cooking a food item by checking for potential errors in the cooking process.

FIG. 9 illustrates an example cooking system 200 that may assist a user in cooking a food item (such as a steak or chili) by checking for potential errors in the cooking process. As is illustrated, the cooking system 200 includes a wireless device 14 (such as a mobile phone or tablet) that may check for potential errors in the cooking process. For example, the wireless device 14 may check that a user is utilizing the correct cooking device 82 during the cooking process.

The wireless device 14 may be substantially similar to the wireless device 14 of FIGS. 1A-1B. For example, the wireless device 14 may be a laptop, a mobile telephone or cellular telephone (such as a Smartphone), an electronic notebook, a tablet (such as an iPad), a personal digital assistant, a video projection device, any other device capable of receiving, processing, storing, and/or communicating information with other components of system 200 and/or system 10, or any combination of the preceding. Furthermore, as illustrated, wireless device 14 includes a network interface 18, a processor 22 (that executes an electronic cookbook 30), and a memory unit 26. Further details regarding each these components is discussed above with regard to FIGS. 1A-1B.

As is illustrated, the cooking system 200 further includes a cooking device system 82 in communication with the wireless device 14 via network 42. Network 42 may be substantially similar to network 42 of FIGS. 1A-1B. Furthermore, cooking device system 82 may be substantially similar to cooking device system 82 of FIGS. 1A-1B. For example, the cooking device system 82 may include a cooking device 86 (e.g., a pot, a pan, a vessel, a spoon, tongs, a spatula, etc.), a network interface 94, a processor 98 (that executes cooking device system management application 106, and a memory unit 102). As is illustrated, the cooking device system 82 does not include measurement sensors 90; however, in some examples, the cooking device system 82 does include one or more measurement sensors 90. Further details regarding each these components is discussed above with regard to FIGS. 1A-1B.

According to the illustrated example, the cooking device system 82 further includes one or more motion sensors 204. A motion sensor 204 represents any sensor that may sense a motion associated with the cooking device system 82. For example, the motion sensor 204 may be an accelerometer. The motion sensor 204 may be a two-dimensional motion sensor, or a three-dimensional motion sensor. The motion sensor 204 may sense motion in any direction and/or may sense a rotation (or other movement) about any coordinate axis. In addition to sensing a motion, the motion sensor 204 may transmit an indication of the sensed motion to the processor 22. For example, if the motion sensor 204 senses a tap on the handle of the cooking device 86, the motion sensor 204 may transmit an indication of that tap to the processor 98 and/or the processor 22. The indication of the sensed motion may be any information that identifies (or allows a processor to identify) the sensed motion.

The cooking device system 82 may include any number of motion sensors 204. For example, the cooking device system 82 may include one motion sensor 204, two motion sensors 204, three motion sensors 204, or any other number of motion sensors 204. In some examples, it may be preferable for the cooking device system 82 to include multiple motion sensors 204, so as to assist in sensing motion in any direction and sensing rotation (or other movement) about any coordinate axis.

Each motion sensor 204 may sense a different type of motion. For example, a first motion sensor 204 may sense an up-and-down movement while the second motion sensor 204 may sense a left and right movement. Alternatively, one or more motion sensors 204 may sense the same type of motion. This may allow the detected motion of a first motion sensor 204 to be compared to a detected motion of a second motion sensor 204, so as to determine whether one of the motion sensors 204 falsely detected motion.

The motion sensor(s) 204 may be positioned at (and coupled at) any location in or on the cooking device system 82 (or the cooking device 86) so as to allow the motion sensor(s) 204 to sense motion, and to further allow the motion sensor(s) 204 to transmit such information to the processor 98. As an example, the motion sensor(s) 204 may be coupled to a base of cooking device 86. As another example, the motion sensor(s) 204 may be coupled to the handle (in the interior and/or on the exterior) of the cooking device 86. As is illustrated, the motion sensor(s) 204 are coupled in the interior of the handle of the cooking device 86.

As is discussed above, the cooking device system 82 may further include one or more network interfaces 94, one or more processors 98, and one or more memory units 102. The network interface 94, processor 98, and memory unit 102 may be positioned at (and coupled at) any location on or in the cooking device system 82 so as to allow the network interface 94 and processor 98 to communicate with the motion sensor(s) 204, and further communicate with other elements of the system 200, such as the wireless device 14. According to the illustrated example, the network interface 94, processor 98, and memory unit 102 are positioned in (or on) the handle of the cooking device 86. Such a positioning may, in some examples, protect these components from excessive heat. As further examples, one or more of the network interface 94, processor 98, and/or memory unit 102 may be integrated with the motion sensor(s) 204, or the cooking device system 82 may only include the motion sensor(s) 204 (as opposed to the other components). In such examples, the motion sensor(s) 204 may be able to communicate directly (via a wireless or wired link) with other elements of the system 200, such as the wireless device 14.

In examples where the cooking device system 82 includes more than one handle, the motion sensors 204, network interface 94, processor 98, and/or memory unit 102 may be distributed between two or more of the handles, but may remain in power and signal communication. Alternatively, none of the elements may be positioned on or in the handles. Instead, they may be positioned on or in other locations of the cooking device system 82.

Although described as being included on or in the cooking device 86, the motion sensors 204, network interface 94, processor 98, and/or memory unit 102 may be removable from the cooking device 86 (e.g., removable from the handle of the cooking device 86). This may allow one or more of these elements to be removed from a current cooking device 86 and subsequently coupled to a different cooking device 86. Thus, one set of motion sensors 204, network interface 94, processor 98, and/or memory unit 102 may be re-useable on multiple cooking devices 86.

Furthermore, when the handle includes the motion sensors 204, network interface 94, processor 98, and/or memory unit 102, the entire handle (including all of its elements) may be removed from the cooking device 86. This may allow the handle (and all of its elements) to be removed from a current cooking device 86 and subsequently coupled to a different cooking device 86. Thus, a single handle may be re-useable on (and interchangeable with) multiple cooking devices 86. As an example, a handle may originally be coupled to a pot, but may be removed and coupled to a pan. As another example, a handle may originally be coupled to a spatula, but may be removed and coupled to a knife, or even a pan.

In an exemplary embodiment of operation of cooking system 200, a user may desire to cook a food item, such as steak or chili. To do so, the user may utilize their wireless device 14 and electronic cookbook 30 to select a particular recipe to cook, as is discussed above with regard to FIGS. 1A-1B.

Following (or during) selection of the recipe, the wireless device 14 may determine an identity of a cooking device system 82 to be used to cook the food item. The wireless device 14 may determine the identity of the cooking device system 82 in any manner. As an example, the wireless device 14 may determine the identity of the cooking device system 82 by receiving a selection from a user (via the electronic cookbook 30, for example) of the cooking device system 82 the user intends to use, as is discussed above with regard to FIGS. 1A-1B. As another example, the wireless device 14 may determine the identity of the cooking device system 82 by the wireless device 14 automatically selecting the particular cooking device system 82 (based on the cooking recipe, for example) to be used for cooking the food item, and then instructing the user to use that particular cooking device system 82, as is also discussed above with regard to FIGS. 1A-1B. As a further example, the wireless device 14 may determine the identity of the cooking device system 82 by the user activating (e.g., pressing a power button) a particular cooking device system 82 to be used for cooking the food item, causing the cooking device system 82 to broadcast packets (or other information) to the wireless device 14.

Following the selection of a particular cooking device system 82, the wireless device 14 may establish a communication link with the selected cooking device system 82, as is discussed above with regard to FIGS. 1A-1B. This communication link may be established over network 42, as is illustrated in FIG. 1B.

Following the establishment of the communication link, the wireless device 14 may receive information from the cooking device system 82 that may allow the wireless device 14 to check for potential errors in the cooking process. As an example of this, the wireless device 14 may utilize the received information to determine whether or not the cooking device system 82 is currently being used in the cooking process. A cooking device system 82 may be currently being used in the cooking process when the correct cooking device system 82 is currently being used in the cooking process. For example, if a particular 10 quart pot was selected as the cooking device system 82 to cook chili, the cooking device system 82 may be currently being used in the cooking process when that particular 10 quart pot is being used to cook chili. Similarly, the cooking device system 82 may not be currently being used in the cooking process when a different pot (e.g., a 5 quart pot, a 50 quart pot, or even a different but seemingly identical 10 quart pot) is being used in one or more steps of the chili recipe. This may occur when, for example, the user has accidentally started making the chili with the different pot. If the cooking device system 82 is not currently being used in the cooking process, the wireless device 14 may transmit a warning message to the user.

The information transmitted to the wireless device 14 may be motion information associated with the cooking device system 82. For example, the information may be an indication of one or more motions detected by the motion sensor(s) 204 of the cooking device system 82. The motion sensor(s) 204 may detect any type of motion associated with the cooking device system 82. For example, the motion sensor(s) 204 may detect the cooking device system 82 being moved (up, down, left, right, etc.), being set down on a surface, being picked up from a surface, being bumped, being shifted, being tilted, any other movement of the cooking device system 82, or any combination of the preceding. As another example, the motion sensor(s) 204 may detect food items being added to the cooking device system 82 (e.g., food being dropped or poured into a pot), vibrations associated with the stirring of contents in the cooking device system 82, any other movement inside of or on the cooking device system 82, or any combination of the preceding. As a further example, the motion sensor(s) 204 may detect that there is no current movement of the cooking device system 82, or that there is no current movement inside of or on the cooking device system 82.

Following detection of one or more motions, the cooking device system 82 may transmit an indication of the detected motion(s) to the wireless device 14, as is illustrated by indication 208. This indication may be data (or other information) that may allow the wireless device 14 to determine the detected motion(s). For example, the indication may be data that indicates that a motion that has occurred (e.g., yes, no), data that indicates the type of motion that has occurred (e.g., upward movement), data that indicates how long a particular motion has occurred (e.g., 2 second), data that indicates any other information associated with a motion (or a detected lack of motion), or any combination of the preceding. The indication may be the data itself (e.g., data that expressly identifies the movement as upward movement), or it may be a signal or pointer (or any other type of data) that may be used by the wireless device 14 to determine information about the motion (e.g., a pointer that causes the processor 22 to look up stored data in order to determine that the cooking device system 82 moved upward).

The cooking device system 82 may transmit an indication of a detected motion at any time and for any reason. For example, the cooking device system 82 may transmit an indication of a motion any time a motion is detected, in accordance with a schedule (e.g., every five seconds, every third detected motion), whenever it is prompted (e.g., whenever the cooking device system 82 receives a request for the data), any other time, or any combination of the preceding.

Following transmittal of the indication of the detected motion, the processor 22 of the wireless device 14 may receive the indication and may determine whether or not the cooking device system 82 is currently being used in the cooking process based on the indication. The processor 22 may determine whether or not the cooking device system 82 is currently being used in the cooking process in any manner. For example, the processor 22 may compare the received indication to the information included in the electronic cookbook 30 in order to make this determination.

As an example of this, if the received indication indicates that there is no detected movement associated the cooking device system 82, but the current stage in the cooking recipe indicates that there should be detected movement (e.g., the contents of the cooking device system 82 should be being stirred, the cooking device system 82 should be being moved to a stove, food items should be being added to the cooking device system 82), the processor 22 may determine that the cooking device system 82 is not currently being used in the cooking process. This error may be the result of the user accidentally using the wrong pot during the cooking process. For example, this error may be the result of the user accidentally stirring the contents of an entirely different pot (instead of the cooking device system 82), the user accidentally moving an entirely different pot (instead of the cooking device system 82) to the stove, the user accidentally adding food items to an entirely different pot (instead of the cooking device system 82). Alternatively, if the received indication indicates that there is a detected movement associated the cooking device system 82, and the current stage in the cooking recipe indicates that there should be detected movement, the processor 22 may determine that the cooking device system 82 is currently being used in the cooking process.

Furthermore, the processor 22 may determine whether or not the cooking device system 82 is currently being used in the cooking process based on indications received from entirely different cooking device systems 82. For example, although a particular cooking device system 82 (e.g., a particular 10 quart pot) has been selected to be used to cook chili, the user may have started making chili with an entirely different cooking device system 82 (e.g., a 5 quart pot, a 50 quart pot, or even a different but seemingly identical 10 quart pot). In such an example, the entirely different cooking device system 82 (e.g., the 5 quart pot) may transmit an indication of a detected motion to the wireless device 14, and this indication may be used to make the determination. As an example of this, if a particular cooking device system 82 (e.g., a particular 10 quart pot) has been selected to be used to cook chili, but the wireless device 14 receives an indication of detected motion from an entirely different cooking device system 82 (e.g., the 5 quart pot), the processor 22 may determine that the particular cooking device system 82 (e.g., the particular 10 quart pot) is not currently being used in the cooking process.

Additionally, such a determination may be made even when multiple cooking device systems 82 are simultaneously being used in the cooking process. For example, a user may be cooking two different food items (such as chicken and a sauce). In such an example, a frying pan may have been selected as the cooking device system 82 to cook the chicken, and a 5 quart pot may be been selected as the cooking device system 82 to cook the sauce. In this example, both the frying pan and the 5 quart pot may send indications of a detected motion to the processor 22 of the wireless device 14, and the processor 22 may use one or more of these indications to determine whether or not the correct cooking device systems 82 are currently being used in the cooking process.

As an example of this, the current stage in the cooking recipe may indicate that there should be detected movement from the frying pan, but not the 5 quart pot. In such an example, if the wireless device 14 receives an indication that there is no detected movement from the frying pan, but there is detected movement from the 5 quart pan, the processor 22 may determine that the cooking device systems 82 are not currently being used in the cooking process. This error may be the result of the user accidentally using the wrong cooking device systems 82 during a particular stage in the cooking recipe. For example, this error may be caused by the user accidentally adding the chicken to the 5 quart pan (instead of the frying pan), or the user accidentally stirring the sauce of the 5 quart pan (instead of flipping the chicken in the frying pan), or the user accidentally moving the 5 quart pan off of the heat source 50 (instead of moving the frying pan off of the heat source 50). Alternatively, if the wireless device 14 receives an indication that there is detected movement from the frying pan, and there is no detected movement from the 5 quart pan, the processor 22 may determine that the cooking device systems 82 are currently being used in the cooking process.

Following a determination by the processor 22 that the cooking device system 82 is currently being used in the cooking process, the processor 22 may take no further action with regard to the determination. Instead, the processor 22 may continue to receive subsequent indications and may continue to make subsequent determinations regarding whether or not the cooking device systems 82 is currently being used in the cooking process. Such steps may continue until the cooking process is complete, or until the user turns off this determination process.

Alternatively, following a determination by the processor 22 that the cooking device system 82 is not currently being used in the cooking process, the processor 22 may transmit an indication of an error in the cooking process. The processor 22 may transmit the indication of the error in the cooking process for display to a user. For example, a message informing the user of an error in the cooking process may be transmitted for display on the screen of the wireless device 14, or it may be transmitted for display on any other screen (e.g., a display built into an appliance, such as a FPD on a refrigerator or oven). The indication of the error may include any amount of information about the error. For example, the indication may include information that indicates that an error has occurred (e.g., "error"), information that indicates the type of error that has occurred (e.g., a message stating that the wrong pot is being used), information that indicates what caused the error message (e.g., a message stating that the pot A was supposed to be moved, but pot B was moved instead), any other information about the error, or any combination of the preceding. The indication of the error may be a graphical message (e.g., a message displayed on the screen of the wireless device 14), an audible sound (e.g., a beeping noise warning the user), a mechanical message (e.g., a vibration of the wireless device 14), any other type of indication or manner of alerting the user, or any combination of the preceding.

In some examples, the processor 22 may additionally (or alternatively) transmit the indication of the error in the cooking process to the cooking device system 82. Such an indication may cause the cooking device system 82 to attempt to warn the user of the error. For example, the cooking device system 82 may generate an audible sound (e.g., a beeping noise warning the user), a mechanical message (e.g., a vibration of the cooking device system 82), a visual message (e.g., a warning light on the cooking device system 82 may turn on or blink), any other type of indication or manner of alerting the user, or any combination of the preceding.

In some examples, the processor 22 may additionally (or alternatively) transmit the indication of the error in the cooking process to the heat source system 46. Such an indication may cause the heat source system 46 to attempt to warn the user of the error. For example, the heat source system 46 may generate an audible sound (e.g., a beeping noise warning the user), a mechanical message (e.g., a vibration of the heat source system 46), a visual message (e.g., a warning light on the heat source system 46 may turn on or blink), any other type of indication or manner of alerting the user, or any combination of the preceding. Furthermore, in some examples, the indication may cause the heat source system 46 to turn off one or more of the heat sources 50, adjust the amount of energy being provided by one or more of the heat sources 50, modify the cooking process in any other way, or any combination of the preceding.

Following the transmittal of the indication of the error in the cooking process, the user may attempt to correct the error. For example, the user may identify the correct cooking device system 82, and may begin using that correct cooking device system 82 in the cooking process. Alternatively, the user may determine that the indication of the error is incorrect. For example, the user may have deliberately moved a cooking device system 82 off of a heat source 50 to prematurely terminate the cooking process (e.g., if the user wanted their steak cooked to a rare as opposed to the medium-rare). In such an example, the indication of the error may be displayed on the screen of the wireless device 14, and the wireless device 14 may request a confirmation from the user that the user intended to remove the cooking device system 82 early (e.g., the user may press a disregard button). If the wireless device 14 does not receive the confirmation, the wireless device 14 may send a subsequent indication of the error, may send a new indication advising the user to move the cooking device system 82 back to the heat source 50, may cause the heat source system 46 to de-energize the heat source 50, may move to a new step in the cooking process (e.g., energize the vacant heat source 50 to a new level, so as to cook another selected food item), may move the entire cooking system 200 to a manual cooking mode, may perform any other action, or any combination of the preceding.

Furthermore, following the transmittal to the indication of the error in the cooking process, the processor 22 may continue to receive subsequent indications and may continue to make subsequent determinations regarding whether or not the cooking device systems 82 is currently being used in the cooking process. Such steps may continue until the cooking process is complete, or until the user turns off this determination process.

Modifications, additions, and/or substitutions may be made to the cooking system 200, the components of the cooking system 200, and/or the functions of the cooking system 200 without departing from the scope of the specification. For example, the example process discussed above with regard to cooking system 200 may include more steps or less steps, and/or the steps may be performed in a different sequence.

Additionally, the cooking system 200 may begin its process of determining whether or not an error has occurred in the cooking process, at any time and for any reason. For example, the process of determining whether or not an error has occurred in the cooking process may begin when a user selects or starts a recipe in the electronic cookbook 30, or when the user indicates that they have started a recipe in manual mode (e.g., where indication of such is received when a knob, switch or button of the heat source system 46 or cooking device system 82 is activated), or when the user activates the determination process (e.g., in the electronic cookbook 30), or at any other time. Furthermore, the cooking system 200 may continue to make subsequent determinations regarding errors in the cooking process any time a new cooking stage (or step) begins, any time a new indication of detected information is received (e.g., when a new movement of the cooking device system 82 is detected), at random times during the cooking process, at pre-scheduled times during the cooking process (e.g., every 1 minute, every 5 minutes), or at any other time. In some examples, it may be preferable to always verify where a cooking device system 82 has been placed before any cooking stage begins, and to continue to verify the correct placement during all cooking stages, including verifying that it is not been inadvertently placed on an energized heat source 50 when cooking has ended.

As another example, the cooking system 200 may include one or more (or all) of the components, functionalities, and/or abilities discussed above with regard to cooking system 10 and FIGS. 1A-B. As a further example, the cooking system 200 may not include one or more of the components, functionalities, and/or abilities discussed above with regard to cooking system 10 and FIGS. 1A-B.

Furthermore, although the processor 22 of the wireless device 14 has been described as performing the steps discussed above, any other processor may perform one or more of the steps discussed above, in some examples. For example, the processor 98 of the cooking device system 82 may determine whether or not it is currently being used in cooking process, and may transmit an indication of an error in the cooking process (e.g., to the user, to the wireless device 14, etc.). As another example, the processor 58 of the heat source system 46 (discussed above with regard to FIGS. 1A-1B) may determine the identity of the cooking device system 82 (e.g., via communications with the wireless device 14 and/or the cooking device system 82), may receive indications of the detected motion(s), may determine whether or not the cooking device system 82 is currently being used in cooking process, and may transmit an indication of an error in the cooking process (e.g., to the user, to the wireless device 14, etc.). The processor that performs the above described steps may be embedded in the wireless device 14, cooking device system 82, or heat source system 42. Alternatively, the processor may be temporarily docked with (or otherwise physically connected to) the wireless device 14, cooking device system 82, or heat source system 42, allowing it to be removed and docked with a different device. Also, the processor may be embedded or docked with an intermediary device that is in communication (wirelessly or wired) with the wireless device 14, cooking device system 82, or heat source system 42.

Additionally, although the determination regarding the cooking device system 82 has been described above as being made based on motion(s) detected by motion sensor(s) 204, the determination may be made based on any other type of information detected by any other type of sensor. For example, the cooking device system 82 may include pressure sensors that detect pressure applied by a user. In such an example, the pressure sensors may be coupled on or in the handle of the cooking device system 82, and may detect when the handle of the cooking device system 82 has been grasped by a user. Then, the determination regarding whether or not the cooking device system 82 is currently being used in the cooking process may be made based on indications of the detected pressure. As an example of this, if the received indication indicates that there is no pressure on the handle of the cooking device system 82, but the current stage in the cooking recipe indicates that the user should be moving the cooking device system 82 to a burner (or off a burner), the processor 22 may determine that the cooking device system 82 is not currently being used in cooking process.

As another example, the cooking device system 82 may include one or more temperature sensors that detect a temperature associated with a food item, as is discussed above with regard to measurement sensors 90. In such an example, the temperature sensor(s) 90 may detect when the cooking device system 82 (or a food item in the cooking device system 82) is being heated. Then, the determination regarding whether or not the cooking device system 82 is currently being used in the cooking process may be made based on indications of the detected temperature. As an example of this, if the received indication indicates that there is no increase in temperature associated with the food item, but the current stage in the cooking recipe indicates that the cooking device system 82 should be receiving heat from a stove top burner (or vice versa), the processor 22 may determine that the cooking device system 82 is not currently being used in cooking process. This may occur, in some examples, when the cooking device system 82 has been accidentally positioned on an inactive burner, or the wrong cooking device system 82 has been positioned on the active burner.

As another example of this, the indications of temperature received from temperature sensors 90 in a cooking device system 82 may be used in conjunction with indications of temperature received from the heat source system 46. For example, a heat source 50 may be set to heat a cooking device system 82 to 375° F. This temperature may then be communicated to the wireless device 14. However, if subsequent indications of temperature from the cooking device system 82 do not indicate a temperature consistent with the set temperature (e.g., the cooking device system 82 is at room temperature, the cooking device system 82 is at 320° F.), processor 22 may determine that the cooking device system 82 is not currently being used in cooking process. This may occur, in some examples, when the cooking device system 82 has been accidentally positioned on the wrong burner (e.g., a burner with a lower heat level), or when the cooking device system 82 was not positioned on any burner (e.g., the user accidentally put the unselected 10 quart pot on the burner instead of the selected 5 quart pot). Such an error correction system may be particularly advantageous when multiple heat sources 50 are being used to apply energy to multiple cooking devices systems 82 so as to cook multiple different types of food items at similar (or identical) time periods.

As a further example of this, these indications of temperature may be used in conjunction with a profile of the cooking device system 82 to determine whether the cooking device system 82 is currently being used in the cooking process. For example, a stored profile for the selected cooking device system 82 may indicate that a particular amount of energy (such as a medium-high level of energy) applied to the cooking device system 82 should cause the food item to be cooked at a particular temperature (such as 375° F.). In such an example, if the heat source 50 is turned to medium-high level, but the temperature sensors in the cooking device system 82 are indicating a temperature of only 320° F. (as opposed to 375° F.), the processor 22 may determine that the cooking device system 82 is not currently being used in cooking process. This may occur, in some examples, when the cooking device system 82 has been accidentally positioned on the wrong burner (e.g., a burner with a lower heat level), or the wireless device 14 is receiving temperature indications from the wrong cooking device system 82 (e.g., the wrong cooking device system 82 was positioned on the burner, and is now providing indications to the wireless device). Such an error correction system may also be particularly advantageous when multiple heat sources 50 are being used to apply energy to multiple cooking devices systems 82 so as to cook multiple different types of food items at similar (or identical) time periods.

As another example, the cooking device system 82 may include one or more other measurement sensors 90, such as electromagnetic radiation sensors (e.g., electromagnetic pick up coils) that detect electromagnetic radiation being emitted by a heat source 50, such as an induction burner. These electromagnetic radiation sensors may be positioned in the handle of the cooking device system 82, the bottom of the cooking device 86, or any other location in the cooking device system 82. Furthermore, the electromagnetic radiation sensors may detect when the cooking device system 82 is positioned on a heat source 50 that it providing an amount of energy (i.e., electromagnetic radiation). Then, the determination regarding whether or not the cooking device system 82 is currently being used in the cooking process may be made based on indications of the detected electromagnetic radiation. As an example of this, if the received indication indicates that electromagnetic radiation has not been detected (e.g., the pot has not been positioned on an active induction burner), but the current stage in the cooking recipe indicates that the cooking device system 82 should be being heated by an active induction burner (or vice versa), the processor 22 may determine that the cooking device system 82 is not currently being used in cooking process. This may occur, in some examples, when the cooking device system 82 has been accidentally positioned on an inactive burner, or the wrong cooking device system 82 has been positioned on the active burner.

As a further example, the cooking device system 82 may include one or more other measurement sensors 90, such as NFC sensors or radio frequency identification (RFID) sensors that detect one or more wireless signals (e.g., BLUETOOTH signals) being transmitted from (or adjacent) a heat source 50. In such an example, one or more (or all of the) heat sources 50 may each have NFC transmitters or RFID transmitters that broadcast (or otherwise communicate) one or more wireless signals that may be detected by the sensors in the cooking device system 82. The range of the transmitters may be short so that a sensor may only pick up the wireless signal when the cooking device system 82 is positioned on (or in) a heat source 50, in some examples. Furthermore, the transmitters may only communicate the wireless signal when the heat source 50 is activated, in some examples. In such examples, the determination regarding whether or not the cooking device system 82 is currently being used in the cooking process may be made based on indications of the detected wireless signals. As an example of this, if the received indication indicates that a wireless signal has not been detected (e.g., the pot has not been positioned on an active burner), but the current stage in the cooking recipe indicates that the cooking device system 82 should be being heated by an active burner (or vice versa), the processor 22 may determine that the cooking device system 82 is not currently being used in cooking process. This may occur, in some examples, when the cooking device system 82 has been accidentally positioned on an inactive burner, or the wrong cooking device system 82 has been positioned on the active burner.

Additionally, although cooking system 200 has been described above as determining whether or not a particular type of error has occurred (e.g., whether or not the cooking device system 82 is currently being used in the cooking process), the cooking system 200 is not limited to that type of error. Instead, the cooking system 200 may make determinations regarding any type of error in the cooking process. For example, the cooking device system 200 may determine whether a user is performing an incorrect action with regard to the cooking device system 82. As an example of this, based on the indications of detected motion (or other indication discussed above), the cooking device system 200 may determine that the user should be stirring the contents of the cooking device system 82 (e.g., based on a comparison with the cooking recipe), or that the user is stirring the contents too hard or too soft (e.g., based on a comparison with the cooking recipe). As another example of this, based on the indications of detected motion (or other indications discussed above), the cooking device system 200 may determine that the user has skipped a step in the cooking process, forgotten a step, or mistakenly marked a step as complete. As an example of this, if the user has indicated in the electronic cookbook 30 that the user has removed the cooking device system 82 from the heat source 50, but no motion was ever detected by the motion sensors 204 of the cooking device system 82, the cooking system 200 may determine that an error has occurred and may notify the user.

As is discussed above, cooking system 200 may allow errors to be detected in the cooking process. This error detection process may be as simple and transparent to the cook or user as possible. In some examples, it may be as simple as the user picking up a pan, thereby allowing the identity of the pan to be determined, as is discussed above.

Figure 10:
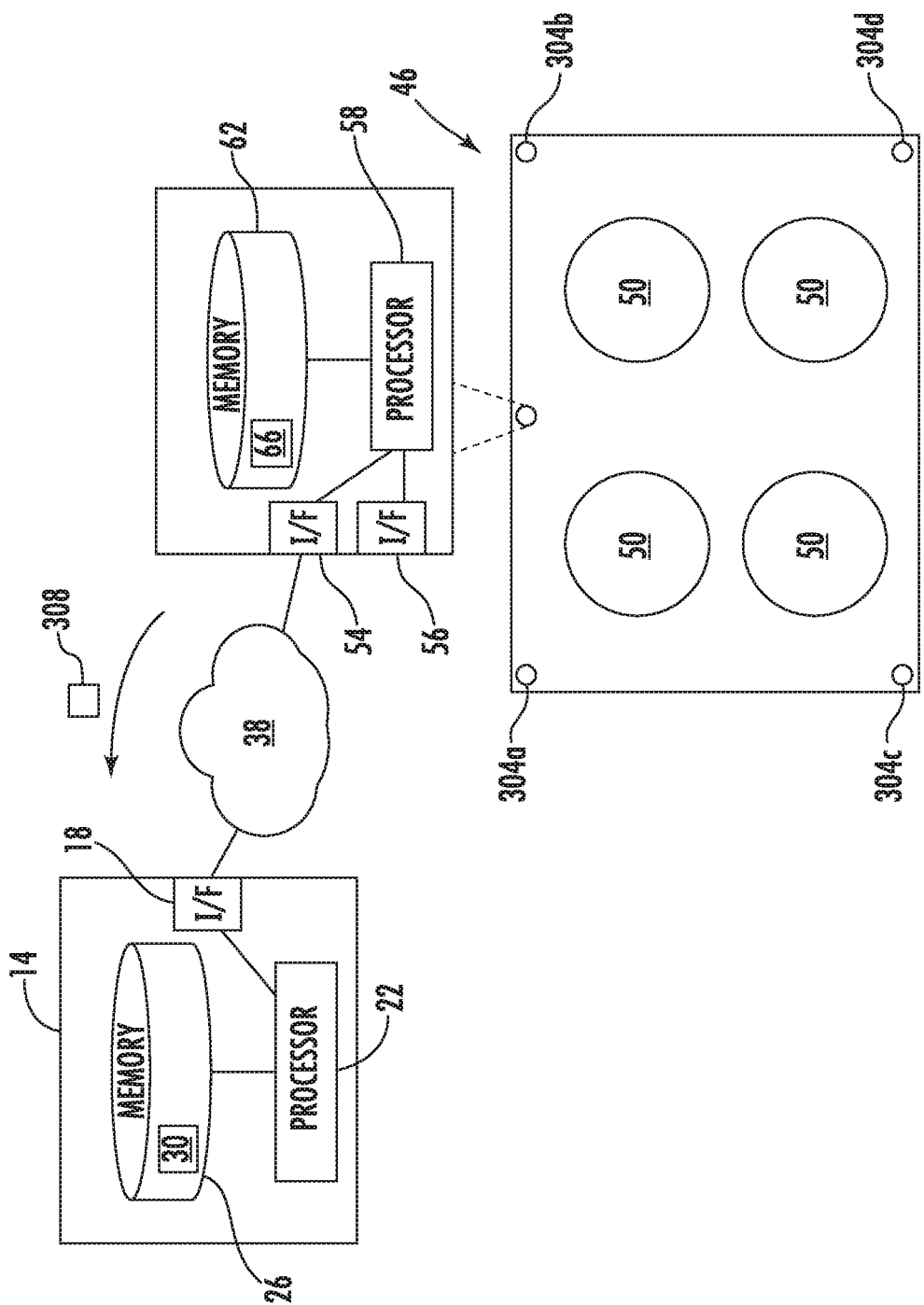
FIG. 10 illustrates another example cooking system that may assist a user in cooking a food item by checking for potential errors in the cooking process.

FIG. 10 illustrates another example cooking system 300 that may assist a user in cooking a food item (such as a steak or chili) by checking for potential errors in the cooking process. As is illustrated, the cooking system 300 includes a wireless device 14 (such as a mobile phone or tablet) that may check for potential errors in the cooking process. For example, the wireless device 14 may check whether or not a user has properly positioned a cooking device system 82 with regard to a heat source 50 of a heat source system 46.

The wireless device 14 may be substantially similar to the wireless device 14 of FIGS. 1A-1B and 9. For example, the wireless device 14 may be a laptop, a mobile telephone or cellular telephone (such as a Smartphone), an electronic notebook, a tablet (such as an iPad), a personal digital assistant, a video projection device, any other device capable of receiving, processing, storing, and/or communicating information with other components of system 300, system 200, and/or system 10, or any combination of the preceding. Furthermore, as illustrated, wireless device 14 includes a network interface 18, a processor 22 (that executes an electronic cookbook 30), and a memory unit 26. Further details regarding each these components is discussed above with regard to FIGS. 1A-1B and 9.

The cooking system 300 may further include a cooking device system 82 (illustrated in FIGS. 1A-1B and 9) in communication with the wireless device 14 via network 42 (illustrated in FIGS. 1A-1B). Network 42 may be substantially similar to network 42 of FIGS. 1A-1B. Furthermore, cooking device system 82 may be substantially similar to cooking device system 82 of FIGS. 1A-1B and 9. For example, as is illustrated, the cooking device system 82 may include a cooking device 86 (e.g., a pot, a pan, a vessel, a spoon, tongs, a spatula, etc.), a network interface 94, a processor 98 (that executes cooking device system management application 106, and a memory unit 102). Further details regarding each these components is discussed above with regard to FIGS. 1A-1B and 9.

As is illustrated, the cooking system 300 further includes a heat source system 46 in communication with the wireless device 14 via network 38. Network 38 may be substantially similar to network 38 of FIGS. 1A-1B. Furthermore, heat source system 46 may be substantially similar to heat source system 46 of FIGS. 1A-1B. For example, as is illustrated, the heat source system 46 may include one or more heat sources 50 (e.g., a burner, a resistive heating element, a heat lamp, an oven, a microwave, a stove top, a range, a grill, etc.), a network interface 54, a user interface system 56, a processor 58 (that executes heat source system management application 66), and a memory unit 62. Further details regarding each these components is discussed above with regard to FIGS. 1A-1B. As is illustrated, the heat source system 46 is a stove top that includes 4 heat sources 50 (e.g., burners). The heat source system 46, however, may include any other number of heat source 50.

According to the illustrated example, the heat source system 46 further includes one or more measurement sensors 304 (e.g., measurement sensors 304a-304d). A measurement sensor 304 represents any sensor that may measure or detect information associated with a heat source system 46 in order to assist the cooking system 300 in checking for potential errors in the cooking process.

For example, the measurement sensor 304 may be a weight sensor (e.g., a pressure gauge, a strain gauge) that can detect a force or weight applied to a heat source system 46. In such an example, the measurement sensor 304 may detect a weight of a cooking device system 82 positioned on a particular heat source 50, or detect that a force has been applied to a particular heat source 50 due to the placement of cooking device system 82 on a particular heat source 50. In addition to detecting the force or weight, the measurement sensor 304 may transmit an indication of the detected force or weight to the processor 58 of the heat source system and/or the processor 22 of the wireless device 14.

As another example, the measurement sensor 304 may be a NFC sensor or an RFID sensor that may detect one or more wireless signals (e.g., BLUETOOTH signals) being transmitted from a cooking device system 82. In such an example, the cooking device systems 82 may each have NFC transmitters or RFID transmitters that broadcast (or otherwise communicate) one or more wireless signals that may be detected by the measurement sensors 304 in the heat source system 82. The range of the transmitters may be short so that a measurement sensor 304 may only pick up the wireless signal when the cooking device system 82 is positioned on (or in) a heat source 50, in some examples. In addition to detecting the wireless signal, the measurement sensor 304 may transmit an indication of the detected signal to the processor 58 of the heat source system and/or the processor 22 of the wireless device 14.

As another example, the measurement sensor 304 may be a motion sensor that may detect a motion associated with a heat source 50. For example, the measurement sensor 304 may be an accelerometer. In some examples, the measurement sensor 304 may be substantially similar to the motion sensor 204 discussed above with regard to FIG. 9. The measurement sensor(s) 304 may detect motion associated with a cooking device system 82 being positioned on a particular heat source 50 or being removed from a particular heat source 50. As a further example, the measurement sensor(s) 304 may detect that there is no current movement associated with the heat source system 46. In addition to detecting a motion, the measurement sensor 304 may transmit an indication of the detected motion to the processor 58 of the heat source system and/or the processor 22 of the wireless device 14.

The heat source system 46 may include any number of measurement sensors 304. For example, the heat source system 46 may include one measurement sensor 304, two measurement sensors 304, three measurement sensors 304, or any other number of measurement sensors 304. In some examples, the heat source system 46 may include at least one measurement sensor 304 for each heat source 50 included in the heat source system 46. For example, when the heat source system 46 includes four heat sources 50, the heat source may include at least four measurement sensors 304.

The measurement sensor(s) 304 may be positioned at (and coupled at) any location in or on the heat source system 46 so as to allow the measurement sensor(s) 304 to measure or detect information associated with a heat source system 46. As an example, the measurement sensor(s) 304 may be positioned at (or near) one or more corners of a surface of the heat source system 46 (such as the corners of the stove top surface of a stove top heat source system), as is illustrated in FIG. 10. As another example, the measurement sensor(s) 304 may be positioned at (or near) one or more sides (or edges) of a surface of the heat source system 46 (such as the sides of the stove top surface of a stove top heat source system). As a further example, the measurement sensor(s) 304 may be positioned at (or near) one or more heat sources 50 of the heat source system 46 (such as the burners of the stove top surface of a stove top heat source system).

The measurement sensor(s) 304 may be positioned in or on (and coupled to) any surface of the heat source system 46 so as to allow the measurement sensor(s) 304 to measure or detect information associated with a heat source system 46. As an example, the measurement sensor(s) 304 may be positioned at a location in-between the top surface of the heat source system 46 and the support structure of the heat source system 46 (such as in-between the top platen of a stove top and the base structure of the stove top). Such a positioning may allow the measurement sensor(s) 304 (such as pressure gauges) to detect the weight of a pan positioned on the top platen of the stove top (or on a burner of the stove top), in some examples. As another example, the measurement sensor(s) 304 may be positioned at a location on the top surface of the heat source system 46 (such as on the top platen of a stove top). Such a positioning may allow the measurements sensor(s) 304 (such as a NFC receiver) to detect a wireless signal without the signal having to pass through the material of the top platen, in some examples. As a further example, the measurement sensor(s) 304 may be positioned at a location in the top surface (or other surface) of the heat source system 46 (such as in the top platen of a stove top). Such a positioning may allow the measurements sensor(s) 304 (such as an accelerometer) to detect motion of the platen, and may further provide thermal protection to the measurement sensors 304.

As is discussed above, the heat source system 46 may include one or more network interfaces 54, one or more user interface systems 56, one or more processors 58, and one or more memory units 62. The network interface 54, user interface system 56, processor 58, and memory unit 62 may be positioned at (and coupled at) any location on or in the heat source system 46 so as to allow the network interface 54 and processor 58 to communicate with the measurement sensor(s) 304, and further communicate with other elements of the system 300, such as the wireless device 14. In some examples, one or more of the network interface 54, processor 58, and/or memory unit 62 may be integrated with the measurement sensor(s) 304, or the heat source system 46 may only include the measurement sensor(s) 304 (as opposed to the other components). In such examples, the measurement sensor(s) 304 may be able to communicate directly (via a wireless or wired link) with other elements of the system 300, such as the wireless device 14.

In an exemplary embodiment of operation of cooking system 300, a user may desire to cook a food item, such as steak or chili. To do so, the user may utilize their wireless device 14 and electronic cookbook 30 to select a particular recipe to cook, as is discussed above with regard to FIGS. 1A-1B.

Following (or during) selection of the recipe, the wireless device 14 may determine an identity of a cooking device system 82 to be used to cook the food item. The wireless device 14 may determine the identity of the cooking device system 82 in any manner. Examples of this determination are discussed above with regard to FIGS. 1A-1B and 9. Following determination of the identity of the cooking device system 82, the wireless device 14 may utilize this identity in any way. For example, the wireless device 14 may utilize the identity in order to establish a communication link with the cooking device system 82, as is discussed above with regard to FIGS. 1A-1B. As another example, the wireless device 14 may utilize the identity in order to retrieve additional information about the cooking device system 82. For example, the wireless device 14 may store (or access) a profile associated with the particular cooking device system 82, and may use the profile to check for potential errors in the cooking process. Such a profile may include a type of cooking device 86 (e.g., a pot), a volume of the cooking device 86 (e.g., 5 quarts), a material type of the cooking device 86 (e.g., copper bottom), any other information associated with the cooking device 86 of the cooking device system 82, or any combination of the preceding.

Also, following (or during) selection of the recipe, the wireless device 14 may determine an identity of a heat source 50 (or heat source system 46) to be used to cook the food item. The wireless device 14 may determine the identity of the heat source 50 in any manner. As an example, the wireless device 14 may determine the identity of the heat source 50 by receiving a selection from a user (via the electronic cookbook 30, for example) of the heat source 50 the user intends to use, as is discussed above with regard to FIGS. 1A-1B. As an example of this, the user may utilize the electronic cookbook 30 to select the front right burner of a stove top for the cooking process. As another example, the wireless device 14 may determine the identity of the heat source 50 by the wireless device 14 automatically selecting the particular heat source 50 (based on the cooking recipe, for example) to be used for cooking the food item, and then instructing the user to use that particular heat source 50, as is also discussed above with regard to FIGS. 1A-1B. As a further example, the wireless device 14 may determine the identity of the heat source 50 by the user activating a particular heat source 50 (e.g., turning a burner knob) to be used for cooking the food item, causing the heat source system 46 to broadcast packets to the wireless device 14. These packets may identify the heat source 50 that has been turned on.

Following the determination of the identity of the heat source 50, the wireless device 14 may establish a communication link with the heat source system 46 that includes the heat source 50, as is discussed above with regard to FIGS. 1A-1B. This communication link may be established over network 38, as is illustrated in FIG. 1B.

Following the establishment of the communication link, the wireless device 14 may receive information from the heat source system 46 that may allow the wireless device 14 to check for potential errors in the cooking process. As an example of this, the wireless device 14 may utilize the received information to determine whether or not the cooking device system 82 is positioned properly with regard to the heat source 50. A cooking device system 82 may be positioned properly with regard to a heat source 50 when the correct cooking device system 82 is positioned on (or in) the correct heat source 50, in some examples. For example, if a 10 quart pot was selected as the cooking device system 82 and the front left burner of a stove top was selected as the heat source 50, the cooking device system 82 may be positioned properly with regard to the heat source 50 when that particular 10 quart pot is positioned on the front left burner of the stove top. Similarly, the cooking device system 82 may not be positioned properly with regard to a heat source 50 when that particular 10 quart pot is positioned on a different burner of the stove top, when it is positioned on the correct burner (e.g., the front left burner) but it is positioned incorrectly (e.g., it is positioned half on and half off of the burner), or when it is positioned in an entirely different heat source system 46 (e.g., positioned in the oven). Likewise, the cooking device system 82 may not be positioned properly with regard to a heat source 50 when an entirely different cooking device system 82 (e.g., a 20 quart pot, or a seemingly identical but different 10 quart pot) is positioned on the correct burner. If the cooking device system 82 is not positioned properly with regard to the heat source 50, the wireless device 14 may transmit a warning message to the user.

The information transmitted to the wireless device 14 may be an indication of information detected by the measurements sensors 304, as is illustrated by indication 308. For example, when the measurement sensors 304 are weight sensors, the measurement sensor(s) 304 may detect the weight of a cooking device system 82 positioned on a particular heat source 50, and may transmit an indication about this detected weight. The indication may be data (or other information) that may allow the wireless device 14 to determine the detected information. For example, if the measurements sensor(s) 304 detected the weight of a pot on a particular burner, the indication may be data that indicates that a weight has been detected (e.g., yes, no), data that provides additional information about the weight (e.g., 15 pounds), data that provide additional information about the heat source (e.g., weight detected at the front left burner, 15 pounds detected at the front left burner), data that indicates any other information associated with a detected weight (or a detected lack of weight), or any combination of the preceding.

The indication may be the data itself (e.g., data that expressly identifies the amount of weight), or it may be a signal or pointer (or any other type of data) that may be used by the wireless device 14 to determine information about the detection (e.g., a pointer that causes the processor 22 to look up stored data in order to determine that weight was detected at the front left burner).

The heat source system 46 may transmit an indication of detected information (e.g., a detect weight) at any time and for any reason. For example, the heat source system 46 may transmit an indication of a detected weight any time a weight or other force is detected, in accordance with a schedule (e.g., every five seconds, every third detected weight), any time the detection changes (e.g., when the detected weight changes from 15 pounds to zero pounds, indicating that the pot has been removed), whenever it is prompted (e.g., whenever the cheat source system 46 receives a request for the data), any other time, or any combination of the preceding.

Following transmittal of the indication of the detected information, the processor 22 of the wireless device 14 may receive the indication and may determine whether or not the cooking device system 82 is positioned properly with regard to the heat source 50 based on the indication. The processor 22 may determine whether or not the cooking device system 82 is positioned properly with regard to the heat source 50 in any manner. For example, the processor 22 may first determine where a cooking device system 82 is positioned, and may then utilize this determination in order to determine whether or not the cooking device system 82 is positioned properly with regard to the heat source 50.

The processor 22 may determine where a cooking device system 82 is positioned in any manner. For example, when a cooking device system 82 is positioned on the heat source system 46, only a single measurement sensor 304 may detect the weight (or other information) of the cooking device system 82. In such an example, because the processor 22 receives an indication from only a single measurement sensor 304 (e.g., the measurement sensor 304 positioned adjacent the front left burner), the processor 22 may use this single indication to determine that the cooking device system 82 is positioned on the heat source 50 adjacent that particular measurement sensor 304 (e.g., the cooking device system 82 is positioned on the front left burner).

As another example, multiple measurement sensors 304 may detect the weight (or other information) of the cooking device system 82. In such an example, the processor 22 may compare indications received from each measurement sensor 304 in order to determine where the cooking device system is positioned. For example, when a cooking device system 82 is positioned on the front left burner, a first weight may be detected by a measurement sensor 304 positioned adjacent the front left burner, a slightly lighter weight may be detected by a measurement sensor 304 positioned adjacent the back left burner, and even lighter weights may be detected by the measurements sensors 304 positioned adjacent the front right burner and the back right burner. The processor 22 may receive indications of all of these detected weights, and may determine that the cooking device system 82 is positioned on the front left burner based on the heaviest weight detection (e.g., the detection made by the measurement sensor 304 positioned adjacent the front left burner).

Following a determination of where a cooking device system 82 is positioned, the processor 22 may utilize this determination in order to determine whether or not the cooking device system 82 is positioned properly with regard to the heat source 50. This determination may be made in any manner.

As an example, the processor 22 may compare the determined position of the cooking device system 82 to the identity of the selected heat source 50 (e.g., the heat source 50 selected for the cooking process) in order to determine whether or not the cooking device system 82 is positioned properly with regard to the heat source 50. As an example of this, if the front left burner was identified as the selected heat source 50, but the cooking device system 82 is determined to be positioned on the front right burner (as opposed to the front left burner), the processor 22 may determine that the cooking device system 82 is not positioned properly with regard to the heat source 50. Alternatively, if the front left burner is identified as the selected heat source 50, and the cooking device system 82 is determined to be positioned on the front left burner, the processor 22 may determine that the cooking device system 82 is positioned properly with regard to the heat source 50.

As another example, the processor 22 may also utilize a profile for the identified cooking device system 82 (e.g., the cooking device system 82 selected for the cooking process) in order to determine whether or not the cooking device system 82 is positioned properly with regard to the heat source 50. As is discussed above, the processor 22 may store (or access) a profile for cooking device systems 82. Using these profiles, the processor 22 may be able to determine an expected weight associated with a cooking device system 82. For example, if a 10 quart pot was identified as the cooking device system 82 to be used in the cooking process, the processor 22 may utilize this identification to access the profile for the 10 quart pot and determine its weight. If this profile indicates that the minimum weight of the 10 quart pot is 10 pounds (when empty, for example), but none of the measurement sensors 304 have detected a weight of 10 pounds, the processor 22 may determine that the cooking device system 82 (e.g., the 10 quart pot weighing 10 pounds) is not positioned properly with regard to the heat source 50. Instead, a different cooking device system 82 (e.g., a 5 quart pot weighing 5 pounds) may have been accidentally positioned on the heat source 50. Alternatively, if the front left burner is identified as the selected heat source 50, and a 10 pound weight is detected by the measurement sensor 304 adjacent the front left burner, the processor 22 may determine that the cooking device system 82 is positioned properly with regard to the heat source 50.

Such a determination may also be made even when multiple cooking device systems 82 and multiple heat sources 50 are simultaneously being used in the cooking process. For example, a user may be cooking two different food items (e.g., chicken and a sauce). In such an example, a frying pan may have been selected as the cooking device system 82 to be used to cook the chicken and the front left burner may have been selected as the heat source 50 to be used to cook the chicken, while a 10 quart pot may have been selected as the cooking device system 82 to be used to cook the sauce and the back right burner may have been selected as the heat source 50 to be used to cook the sauce. The selected frying pan may have a 5 pound minimum weight while the selected 10 quart pot may have a 10 pound minimum weight. In such an example, if the measurement sensor 304 adjacent the front left burner detects a 5 pound weight (which is consistent with the selected frying pan), and the measurement sensor 304 adjacent the back right burner detects a 10 pound weight (which is consistent with the selected 10 quart pot), the processor 22 may utilize these indications of detected weight (along with the identified profiles) to determine that each cooking device systems 82 is positioned properly with regard to its respective heat source 50. That is, the frying pan is correctly positioned on the front left burner and the 10 quart pot is correctly positioned on the back right burner. On the other hand, if different measurement sensors 304 detect these weights (or other weights), the processor 22 may utilize these indications of detected weight (along with the identified profiles) to determine that one or more of these cooking device systems 82 is not positioned properly with regard to its respective heat source 50. That is, the frying pan may be incorrectly positioned on the back right burner, or incorrectly positioned on any other burner other than the front left burner.

Furthermore, the processor 22 may also utilize additional information from the electronic cookbook 30 in order to make its determination. For example, if the user is cooking a particular recipe (such as chicken), the electronic cookbook 30 may include weight information for each ingredient. The processor 22 may utilize this information along with the weight information of the selected cooking device system 82 in order to determine a more accurate weight (at each stage of the recipe, for example). This may allow the processor 22 to more accurately determine whether or not the cooking device system 82 is positioned properly with regard to the heat source 50 (at each stage of the recipe, for example). For example, if the total weight of the correct cooking device system 82 and its ingredients is 12 pounds, but the measurement sensor 304 detects a weight of 15 pounds, the processor 22 may determine that the wrong cooking device system 82 may be being used.

Following a determination by the processor 22 that the cooking device system 82 is positioned properly with regard to the heat source 50, the processor 22 may take no further action with regard to the determination. Instead, the processor 22 may continue to receive subsequent indications and may continue to make subsequent determinations regarding whether or not the cooking device system 82 is positioned properly with regard to the heat source 50. Such steps may continue until the cooking process is complete, or until the user turns off this determination process.

Alternatively, following a determination by the processor 22 that the cooking device system 82 is not positioned properly with regard to the heat source 50, the processor 22 may transmit an indication of an error in the cooking process. The processor 22 may transmit the indication of the error in the cooking process for display to a user. For example, a message informing the user of an error in the cooking process may be transmitted for display on the screen of the wireless device 14, or it may be transmitted for display on any other screen (e.g., a display built into an appliance, such as a FPD on a refrigerator or oven). The indication of the error may include any amount of information about the error. For example, the indication may include information that indicates that an error has occurred (e.g., "error"), information that indicates the type of error that has occurred (e.g., the pot is on the wrong burner), information that indicates what caused the error message (e.g., a message stating that the pot A was supposed to be placed on burner A, but pot B was placed on burner A instead), any other information about the error, or any combination of the preceding. The indication of the error may be a graphical message (e.g., a message displayed on the screen of the wireless device 14), an audible sound (e.g., a beeping noise warning the user), a mechanical message (e.g., a vibration of the wireless device 14), any other type of indication or manner of alerting the user, or any combination of the preceding.

In some examples, the processor 22 may additionally (or alternatively) transmit the indication of the error in the cooking process to the cooking device system 82. Such an indication may cause the cooking device system 82 to attempt to warn the user of the error. For example, the cooking device system 82 may generate an audible sound (e.g., a beeping noise warning the user), a mechanical message (e.g., a vibration of the cooking device system 82), a visual message (e.g., a warning light on the cooking device system 82 may turn on or blink), any other type of indication or manner of alerting the user, or any combination of the preceding.

In some examples, the processor 22 may additionally (or alternatively) transmit the indication of the error in the cooking process to the heat source system 46. Such an indication may cause the heat source system 46 to attempt to warn the user of the error. For example, the heat source system 46 may generate an audible sound (e.g., a beeping noise warning the user), a mechanical message (e.g., a vibration of the heat source system 46), a visual message (e.g., a warning light on the heat source system 46 may turn on or blink), any other type of indication or manner of alerting the user, or any combination of the preceding. Furthermore, in some examples, the indication may cause the heat source system 42 to turn off one or more of the heat sources 50, adjust the amount of energy being provided by one or more of the heat sources 50, modify the cooking process in any other way, or any combination of the preceding. As an example of this, if a cooking pot was supposed to be positioned on the front right burner, but it was accidentally positioned on the front left burner, the heat source system 46 may turn off the front right burner and turn on the front left burner (thereby fixing the accident). Additionally, an indication of this change may be transmitted to the wireless device 14, causing the recipe instructions to be updated based on the new heat source 50.

Following the transmittal of the indication of the error in the cooking process, the user (or the heat source system 46) may attempt to correct the error. For example, the user may identify the correct cooking device system 82 (or the correct heat source 50), and may begin using that correct cooking device system 82 (or the correct heat source 50) in the cooking process. Alternatively, the user may determine that the indication of the error is incorrect. For example, the user may have deliberately moved a cooking device system 82 off of a heat source 50 to prematurely terminate the cooking process (e.g., if the user wanted their steak cooked to a rare as opposed to the medium-rare). In such an example, the indication of the error may be displayed on the screen of the wireless device 14, and the wireless device 14 may request a confirmation from the user that the user intended to remove the cooking device system 82 early (e.g., the user may press a disregard button). If the wireless device 14 does not receive the confirmation, the wireless device 14 may send a subsequent indication of the error, may send a new indication advising the user to move the cooking device system 82 back to the heat source 50, may cause the heat source system 46 to de-energize the heat source 50, may move to a new step in the cooking process (e.g., energize the vacant heat source 50 to a new level, so as to cook another selected food item), may move the entire cooking system 300 to a manual cooking mode, may perform any other action, or any combination of the preceding.

Furthermore, following the transmittal to the indication of the error in the cooking process, the processor 22 may continue to receive subsequent indications and may continue to make subsequent determinations regarding whether or not the cooking device systems 82 is positioned properly with regard to the heat source 50. Such steps may continue until the cooking process is complete, or until the user turns off this determination process.

Modifications, additions, and/or substitutions may be made to the cooking system 300, the components of the cooking system 300, and/or the functions of the cooking system 300 without departing from the scope of the specification. For example, the example process discussed above with regard to cooking system 300 may include more steps or less steps, and/or the steps may be performed in a different sequence.

Additionally, the cooking system 300 may begin its process of determining whether or not an error has occurred in the cooking process, at any time and for any reason. For example, the process of determining whether or not an error has occurred in the cooking process may begin when a user selects or starts a recipe in the electronic cookbook 30, or when the user indicates that they have started a recipe in manual mode (e.g., where indication of such is received when a knob, switch or button of the heat source system 46 or cooking device system 82 is activated), or when the user activates the determination process (e.g., in the electronic cookbook 30), or at any other time. Furthermore, the cooking system 300 may continue to make subsequent determinations regarding errors in the cooking process any time a new cooking stage (or step) begins, any time a new indication of detected information is received (e.g., when a new weight is detected on the heat source system 46), at random times during the cooking process, at pre-scheduled times during the cooking process (e.g., every 1 minute, every 5 minutes), or at any other time. In some examples, it may be preferable to always verify where a cooking device system 82 has been placed before any cooking stage begins, and to continue to verify the correct placement during all cooking stages, including verifying that it is not been inadvertently placed on an energized heat source 50 when cooking has ended.

As another example, the cooking system 300 may include one or more (or all) of the components, functionalities, and/or abilities discussed above with regard to cooking system 10 and FIGS. 1A-B. As a further example, the cooking system 300 may not include one or more of the components, functionalities, and/or abilities discussed above with regard to cooking system 10 and FIGS. 1A-B.

Additionally, the cooking system 300 may include one or more (or all) of the components, functionalities, and/or abilities discussed above with regard to cooking system 200 and FIG. 9. For example, cooking system 300 may further include a cooking device system 82 that includes one or more motion sensors 204 (or other sensors discussed above with regard to cooking system 200 and FIG. 9). These motion sensors 204 may assist the cooking system 300 in determining whether or not an error has occurred in the cooking process. For example, movement detected by the motion sensors 204 in a cooking device system 82 (or any other information detected by sensors in the cooking device system 82) may be used in conjunction with information detected by the measurement sensors 304 in a heat source system 46 to determine whether an error has occurred in the cooking process. As an example of this, if a particular cooking device system 82 (e.g., a 10 quart pot) is picked up, moved to the heat source system 46, positioned on a particular heat source 50, and then left on the particular heat source 50, the wireless device 14 may receive indications from the motion sensors 204 in the cooking device system 82 and the measurements sensors 304 in the heat source system 46 consistent with each of these actions. This may allow the wireless device 14 to further determine if and when an error occurs.

As an example, a cooking step in the electronic cookbook 30 may indicate that a particular 10 quart pot is to be positioned on the front right burner of a stove top. However, if the wireless device 14 receives indications that (1) a frying pan is being moved, (2) that weight has been detected on the front right burner, and (3) that the frying pan has now stopped moving, the processor 22 of the wireless device 14 may determine that the frying pan is positioned on the front right burner, not the 10 quart pot. Additionally, if the processor 22 receives indications that (1) the 10 quart pot is being moved, (2) that weight has been detected on the front left burner, and (3) that the 10 quart pot has now stopped moving, the wireless device 14 may determine that the 10 quart pot is positioned on the front left burner, not the front right burner.

Furthermore, although the processor 22 of the wireless device 14 has been described as performing the steps discussed above, any other processor may perform one or more of the steps discussed above, in some examples. For example, the processor 98 of the cooking device system 82 may determine the identity of the heat source 50 (e.g., via communications with the wireless device 14 and/or the heat source system 46), may receive indications of the detected information, may determine whether or not the cooking device system 82 is positioned properly with regard to the heat source 50, and may transmit an indication of an error in the cooking process (e.g., to the user, to the wireless device 14, etc.). As another example, the processor 58 of the heat source system 46 (discussed above with regard to FIGS. 1A-1B) may determine the identity of the cooking device system 82 (e.g., via communications with the wireless device 14 and/or the cooking device system 82), may determine the identity of the heat source 50, may receive indications of the detected information, may determine whether or not the cooking device system 82 is positioned properly with regard to the heat source 50, and may transmit an indication of an error in the cooking process (e.g., to the user, to the wireless device 14, etc.). The processor that performs the above described steps may be embedded in the wireless device 14, cooking device system 82, or heat source system 42. Alternatively, the processor may be temporarily docked with (or otherwise physically connected to) the wireless device 14, cooking device system 82, or heat source system 42, allowing it to be removed and docked with a different device. Also, the processor may be embedded or docked with an intermediary device that is in communication (wirelessly or wired) with the wireless device 14, cooking device system 82, or heat source system 42.

Additionally, although the determination regarding the cooking device system 82 has been described above as being made based on weight and/or force detected by measurement sensor(s) 304, the determination may be made based on any other type of information detected by any other type of sensor. For example, as is discussed above, the measurement sensor(s) 304 may be one or more NFC sensors or RFID sensors that detect one or more wireless signals (e.g., BLUETOOTH signals) being transmitted from a cooking device system 82. As an example of this, when the cooking device system 82 is positioned on the front right burner, a measurement sensor 304 adjacent the front right burner may detect a wireless signal transmitted by the cooking device system 82. Following detection of the wireless signal, the heat source system 46 may transmit an indication of the detected signal to the wireless device 14. The indication may be the detected wireless signal itself (or a copy of the signal), data that indicates that a wireless signal has been detected (e.g., yes, no), data that provides additional information about the detected wireless signal (e.g., signal strength), data that provides additional information about the cooking device system 82 that transmitted the signal (e.g., the identity of the cooking device system 82 that transmitted the signal), data that provide additional information about the heat source 50 (e.g., the wireless signal was detected at the front left burner), data that indicates any other information associated with a detected wireless signal (or a detected lack of a wireless signal), or any combination of the preceding.

Following reception of the indication of the detected signal, the processor 22 may use this indication to determine whether or not the cooking device system 82 is positioned properly with regard to the heat source 50. To do so, the processor 22 may first determine where the cooking device system 82 is positioned, and may then utilize this determination in order to determine whether or not the cooking device system 82 is positioned properly with regard to the heat source 50. For example, the processor 22 may determine that the cooking device system 82 is positioned at the front right burner if an indication of a detected signal was only received from a measurement sensor 304 positioned adjacent the front right burner, or if the strongest wireless signal was detected by the measurement sensor 304 positioned adjacent the front right burner (in comparison to weaker signals detected by other measurement sensors 304 positioned elsewhere).

Using this determined position, the processor 22 may then determine whether or not the cooking device system 82 is positioned properly with regard to the heat source 50, as is discussed above. For example, the processor 22 may compare the determined position of the cooking device system 82 (e.g., front right burner) to the identity of the heat source 50 (e.g., front right burner) in order to determine whether or not the cooking device system 82 is positioned properly with regard to the heat source 50. As another example, when the detected wireless signal identifies the cooking device system 82 (e.g., it identifies the signal as being transmitted by a particular 10 quart pot, or if the wireless signal matches a stored profile), the processor 22 may use this identification to determine whether or not the cooking device system 82 is positioned properly with regard to the heat source 50. In such an example, the cooking device system 82 may not be positioned properly if, for example, none of the measurement sensors 304 detected a wireless signal from the selected 10 quart pot, or if the selected 10 quart pot was detected at the front left burner instead of the front right burner. Then, if the processor 22 determines that the cooking device system 82 is not positioned properly with regard to the heat source 50, the processor 22 may transmit an indication of an error in the cooking process, as is discussed above.

As another example, and as is also discussed above, the measurement sensor(s) 304 may be one or more motion sensors (e.g., accelerometers) that sense a motion associated with a heat source 50. As an example of this, when the cooking device system 82 is positioned on the front right burner, a measurement sensor 304 adjacent (e.g., at or near) the front right burner may detect the motion caused by the cooking device system 82 being positioned on the burner (e.g., the weight and force may slightly shake the platen or top surface of the heat source system 46). Following detection of the motion, the heat source system 46 may transmit an indication of the detected motion to the wireless device 14. The indication may be data that indicates that a motion has been detected (e.g., yes, no), data that indicates the type of motion that has occurred (e.g., movement consistent with positioning a pot on the burner, movement consistent with removing a pot from the burner), data that indicates how long a particular motion has occurred (e.g., 2 seconds), data that provide additional information about the heat source 50 (e.g., the motion was detected at the front left burner, the strongest motion was detected at the front left burner), data that indicates any other information associated with a motion (or a detected lack of motion), or any combination of the preceding.

Following reception of the indication of the detected motion, the processor 22 may use this indication to determine whether or not the cooking device system 82 is positioned properly with regard to the heat source 50. To do so, the processor 22 may first determine where a cooking device system 82 is positioned, and may then utilize this determination in order to determine whether or not the cooking device system 82 is positioned properly with regard to the heat source 50. For example, the processor 22 may determine that the cooking device system 82 is positioned at the front right burner if an indication of a detected motion was only received from a measurement sensor 304 positioned adjacent the front right burner, or if the strongest motion was detected by the measurement sensor 304 positioned adjacent the front right burner (in comparison to weaker motions detected by other measurement sensors 304 positioned elsewhere).

Using this determined position, the processor 22 may then determine whether or not the cooking device system 82 is positioned properly with regard to the heat source 50, as is discussed above. For example, the processor 22 may compare the determined position of the cooking device system 82 (e.g., front right burner) to the identity of the selected heat source 50 (e.g., front right burner) in order to determine whether or not the cooking device system 82 is positioned properly with regard to the heat source 50. As another example, if the electronic cookbook 30 indicates that the selected 10 quart pot was to be positioned on the front right burner, but no motion was ever detected at the front right burner, the processor may utilize this lack of a detected motion to determine that the cooking device system 82 is not positioned properly with regard to the heat source 50. Then, if the processor 22 determines that the cooking device system 82 is not positioned properly with regard to the heat source 50, the processor 22 may transmit an indication of an error in the cooking process, as is discussed above.

As a further example, the measurement sensor(s) 304 may be one or more cameras that generate images (e.g., videos, photographs, etc.) of the cooking process. These cameras may be positioned in a location that allows the camera to view all or a portion of a heat source system 46 and its heat source(s) 50. For example, a camera may be positioned vertically above the heat source system 46, and may be pointing downward at the heat sources 50 of the heat source system 46. The camera may be motion activated, causing it to begin generating images when a motion is detected (e.g., when a pot is being placed on a burner). The camera may alternatively (or additionally) be activated by electronic cookbook 30. For example, if a current step in the cooking recipe involves the heat source system 46 (e.g., the step involves positioning a pan on a burner of the heat source system 46), the camera may be activated (e.g., by the wireless device 14) when the step starts, causing it to begin generating images.

Following generation of one or more images, the measurements sensor(s) 304 may transmit an indication of the images the wireless device 14. The indication may be the images themselves, data retrieved from the generated images (e.g., identification tags captured in the images), data that indicates any other information associated with a generated image, or any combination of the preceding.

Following reception of the indication of the images, the processor 22 may use this indication to determine whether or not the cooking device system 82 is positioned properly with regard to the heat source 50. To do so, the processor 22 may first determine where a cooking device system 82 is positioned, and may then utilize this determination in order to determine whether or not the cooking device system 82 is positioned properly with regard to the heat source 50. For example, the processor 22 may determine that the cooking device system 82 is positioned at the front right burner using image processing and recognition. In this example, the processor 22 may compare the generated image of the cooking device system 82 positioned on a particular heat source 50 (e.g., the front right burner) to various stored images of cooking device systems 82 positioned on different heat sources 50 (e.g., positioned on the front right burner, positioned on the front left burner). If the generated image (e.g., a pot positioned on the front right burner) matches a stored image (e.g., a pot positioned on the front right burner), the current cooking device system 82 may be determined to be positioned on the front right burner. Furthermore, the processor 22 may compare the generated image of the cooking device system 82 (e.g., a 10 quart pot) to various stored images of cooking device systems 82 (e.g., a stored image of the 10 quart pot, a stored image of a frying pan, etc.). If the generated image (e.g., a 10 quart pot) matches a stored image (e.g., a 10 quart pot), the current cooking device system 82 may be determined to be a 10 quart pot.

As another example, the processor 22 may determine that the cooking device system 82 is positioned at the front right burner using one or more tags included in the images. In such an example, the cooking device systems 82, heat source systems 46, and heat sources 50 may each include unique tags (e.g., infrared tags) that can be imaged by a camera. When a particular 10 quart pot is positioned on the front right burner, the camera may generate images of this. These images may include the unique tags for the 10 quart pot and the front right burner. The processor 22 may then process the images to identify the 10 quart pot and the front right burner based on their unique tags. For example, the processor 22 may identify the 10 quart pot based on its unique tag, and may further identify that the 10 quart pot is positioned on the front right burner based on the close proximity between the unique tag of the 10 quart pot and the unique tag of the front right burner. In some examples, the unique tags may be activated before they can be detected by the camera. For example, the unique tag of the 10 quart pot and the front right burner may only be visible to the camera when they are subjected to energy (e.g., heat, electromagnetic radiation). This may further assist the processor 22 in determining that the cooking device system 82 is positioned at the front right burner Using the determined position of the cooking device system 82, the processor 22 may then determine whether or not the cooking device system 82 is positioned properly with regard to the heat source 50, as is discussed above. For example, the processor 22 may compare the determined position of the cooking device system 82 (e.g., front right burner) to the identity of the selected heat source 50 (e.g., front right burner) in order to determine whether or not the cooking device system 82 is positioned properly with regard to the heat source 50. As another example, if the electronic cookbook 30 indicates that the selected 10 quart pot was to be positioned on the front right burner, but the selected 10 quart pot was photographed on the front left burner, the processor 22 may determine that the cooking device system 82 is not positioned properly with regard to the heat source 50. Then, if the processor 22 determines that the cooking device system 82 is not positioned properly with regard to the heat source 50, the processor 22 may transmit an indication of an error in the cooking process, as is discussed above.

As a further example, the measurement sensor(s) 304 may be one or more temperature sensors that measure a temperature associated with a heat source 50. These temperature sensor(s) may be adjacent (e.g., under, over, at, near) each heat source 50. Furthermore, the distance between a heat source 50 and an adjacent temperature sensor 304 may be selected in order to replicate (or be consistent with) a temperature that would be received by a cooking device system 82 positioned on the heat source 50. For example, the distance between a heat source 50 and an adjacent temperature sensor 304 may be selected so that the temperature sensor 304 detects a temperature of 375° F. when a cooking device system 82 would receive 375° F. of heat from the heat source 50. This may allow the temperature sensor 304 to detect a more accurate temperature. In some examples, the temperature sensors may be positioned on or in the platen, glass, or dielectric substrate that supports the heat source 50 or the cooking device system 82 positioned on the heat source 50. Such positioning may allow the temperature sensor to accurately measure the temperature output of the heat source 50, while providing protection to the temperature sensor (e.g., from heat, from being bumped by a user).

When a heat source 50 is activated (or the temperature of the heat source 50 is changed), the measurement sensor 304 positioned adjacent the heat source 50 may detect the temperature output by the heat source 50. Following detection of the temperature, the heat source system 46 may transmit an indication of the detected temperature to the wireless device 14. The indication may be data that indicates that a temperature has been detected (e.g., yes, no), data that indicates the actual temperature (e.g., 375° F., medium-high temperature, a rate of change of the temperature such as 10° F. per second), data that provide additional information about the heat source 50 (e.g., the 375° F. was detected at the front left burner), data that indicates any other information associated with a temperature (or a detected lack of motion), or any combination of the preceding.

Following reception of the indication of the detected temperature, the processor 22 may use this indication to determine whether or not there is an error in the cooking process. For example, if a measurement sensor 304 adjacent the back right burner detects a temperature of 375° F. (or a rate of change of temperature of 10° F. per second), and the cooking step in the electronic cookbook 30 indicates that the back right burner is supposed to be applying heat at a temperature of 375° F. (or changing the temperature at a rate of 10° F. per second) to a pot, the processor 22 may determine that the back right burner is not set correctly. As another example, if a temperature change was detected at the front right burner, but the cooking step in the electronic cookbook 30 indicates that the temperature change was supposed to occur at the front left burner, the processor 22 may determine that the wrong heat source 50 was activated. Then, if the processor 22 determines that an error has occurred in the cooking process, the processor 22 may transmit an indication of an error in the cooking process, as is discussed above.

The temperature sensor(s) 304 discussed above may, in some examples, work in conjunction with temperature sensor(s) included on a cooking device system 82. For example, as is discussed above with regard to FIGS. 1A-1B and 9, the cooking device system 82 may include one or more temperatures sensors (e.g., measurement sensors 90) that detect a temperature associated with a food item, as is discussed above. These temperature sensors may detect a temperature associated with a food item, and may transmit indications of such detected temperatures. In such examples, the processor 22 of the wireless device (or other device) may receive indications of a temperature from both the heat source system 46 and the cooking device system 82. These indications may then be used to determine whether or not the cooking device system 82 is positioned properly with regard to the heat source 50.

As an example of this, the processor 22 may compare the received indications of temperature to the profile of a selected cooking device system 82. In particular, the profile for the selected cooking device system 82 may indicate that a particular amount of energy (such as a medium-high level) applied to the selected cooking device system 82 should cause the food item to be cooked at a particular temperature (such as 375° F.). However, if the received indication from the temperature sensor 304 of the front right burner indicates a temperature of medium high level, but the temperature sensor 90 of the cooking device system 82 indicates a temperature of 350° F. (which is too low), the processor 22 may determine that the wrong cooking device system 82 is positioned on the heat source 50. In such a case, the selected cooking device system 82 may have been positioned on a different burner with a lower temperature setting, or the wireless device 14 may have been receiving temperature indications from an entirely different cooking device system 82 (such as from a 10 quart pot instead of the selected frying pan).

As another example of this, the system 300 may utilize temperature signaling in order to determine whether or not the cooking device system 82 is positioned properly with regard to the heat source 50. In particular, when multiple cooking device systems 82 and heat sources 50 are being used together in the cooking process, the heat source system 46 may purposely change the amount of heat being provided by each heat source 50 in order to determine whether or not each cooking device system 82 is positioned properly with regard to the heat source 50. For example, during a cooking process, a user may be cooking two different food items (such as chicken and a sauce). In such an example, a frying pan may have been selected as the cooking device system 82 to be used to cook the chicken and the front left burner may have been selected as the heat source 50 to be used to cook the chicken, while a 10 quart pot may have been selected as the cooking device system 82 to be used to cook the sauce and the back right burner may have been selected as the heat source 50 to be used to cook the sauce. During the cooking process (e.g., when the heat sources 50 are beginning to heat up), the heat source system 46 may set the front left burner to heat up at a first temperature rate (e.g., 10° F. per second), and the heat source system 46 may further set the back right burner to heat up at a second temperature rate (e.g., 5° F. per second). In such an example, if the indications received from cooking device systems 82 do not match these settings (e.g., the frying pan is not receiving an increase in heat of 10° F. per second, and/or the 10 quart pot is not receiving an increase in heat of 5° F. per second), the processor 22 may determine that the wrong cooking device systems 82 are positioned on the heat sources 50.

As another example, during the cooking process, the heat source system 46 may sequentially modify the amount of heat provided by each heat source 50 (e.g., turn the front left heat source 50 off for 2 seconds, and then turn the back right heat source 50 off for 2 seconds). It may then compare these modifications to determine if they match the indications received from temperature sensors in the cooking device system 82. If they do not match, the processor 22 may determine that the wrong cooking device systems 82 are positioned on the heat sources 50.

Additionally, although cooking system 300 has been described above as determining whether or not a particular type of error has occurred (e.g., whether or not the cooking device system 82 is positioned properly with regard to the heat source 50), the cooking system 300 is not limited to that type of error. Instead, the cooking system 300 may make determinations regarding any type of error in the cooking process. For example, the cooking device system 300 may determine whether a user is performing an incorrect action with regard to the cooking device system 82. As an example of this, based on the indications of detected information (e.g., weight, wireless signal, temperature etc.), the cooking device system 300 may determine that the user positioned the cooking device system 82 on the heat source 50 to early, or that the user has removed the cooking device system 82 too early, or that the user has activated the wrong heat source 50, or that the user has activated the correct heat source 50 to the wrong temperature. As another example of this, based on the indications of detected information, the cooking device system 300 may determine that the user has skipped a step in the cooking process, forgotten a step, or mistakenly marked a step as complete. As an example of this, if the user has indicated in the electronic cookbook 30 that the user has removed the cooking device system 82 from the heat source 50, but the indications indicate the cooking device system 82 is still positioned on the heat source 50, the cooking system 300 may determine that an error has occurred and may notify the user.

As is discussed above, cooking system 300 may allow errors to be detected in the cooking process. This error detection process may be as simple and transparent to the cook or user as possible. In some examples, it may be as simple as the user picking up a pan and placing the pan on a burner, thereby allowing the identity of the pan and the burner to be determined, as is discussed above.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A system, comprising:
   a. first heat source operable to provide an amount of energy to be used to cook a food item during a cooking process; and
   b. a processor operable, when executed, to:
      i. determine an identity of a first cooking device system of a plurality of cooking device systems, wherein each cooking device system of the plurality of cooking device systems comprises a cooking device configured to support, hold, or enclose a respective food item during the cooking process, wherein each cooking device system of the plurality of cooking device systems has a distinct identity, wherein the first cooking device system is operable to be used in cooking the food item;
      ii. establish a communication link with the first cooking device system;
      iii. receive, via the communication link with the first cooking device system, an indication of a current temperature associated with the food item, wherein the first cooking device system includes a plurality of sensors integrated within the cooking device, wherein the plurality of sensors comprises one or more sensors operable to detect the current temperature associated with the food item, wherein the plurality of sensors further comprises one or more sensors operable to detect a pressure applied to the cooking device system by a user or operable to detect a motion associated with the cooking device system;
      iv. receive an indication of an amount of energy provided by the first heat source;
      v. based on the indication of the current temperature associated with the food item and the indication of the amount of energy provided by the first heat source, determine that there is an error in the cooking process; and
      vi. transmit an indication of the error in the cooking process.

2. The system of claim 1, wherein the system further comprises a heat source system that comprises the heat source and the processor.

3. The system of claim 1, wherein the system further comprises a wireless device that comprises the processor.

4. The system of claim 1, wherein the processor is further operable to transmit the indication of the error in the cooking process to a wireless device.

5. The system of claim 1, wherein the processor is further operable to transmit the indication of the error in the cooking process for display to a user.

6. The system of claim 1, wherein the error in the cooking process comprises the first cooking device system being positioned on a wrong heat source.

7. The system of claim 1, wherein the error in the cooking process comprises a wrong cooking device system being positioned on the first heat source.

8. A system, comprising:
   a. a plurality of cooking device systems, each cooking device system operable to be used in cooking a food item during a cooking process, each cooking device system comprising a cooking device configured to support, hold, or enclose a respective food item during the cooking process, each cooking device system having a distinct identity;
   b. a heat source system comprising a plurality of heat sources, each heat source operable to provide an amount of energy to be used to cook the food item during a cooking process;
   c. a plurality of sensors integrated within each cooking device and operable to detect information associated with the cooking process, wherein the plurality of sensors integrated within each cooking device comprises one or more sensors operable to detect a current temperature associated with the food item in a cooking device, wherein the plurality of sensors integrated within each cooking device further comprises one or more sensors operable to detect a pressure applied to a respective cooking device system by a user or operable to detect a motion associated with the respective cooking device system;
d. a processor operable, when executed, to:
i. determine the identity of a first cooking device system of the plurality of cooking device systems;
ii. determine an identity of a first heat source of the plurality of heat sources;
iii. receive, from the cooking device system, an indication of the detected information associated with the cooking process;
iv. based on the indication of the detected information associated with the cooking process, determine whether there is an error in the cooking process; and
v. following a determination that there is an error in the cooking process, transmit an indication of the error in the cooking process.

9. The system of claim 8, wherein the error in the cooking process comprises the first cooking device system being positioned on another heat source of the plurality of heat sources.

10. The system of claim 8, wherein the error in the cooking process comprises another cooking device system of the plurality of cooking device systems being positioned on the first heat source.

11. The system of claim 8, wherein the error in the cooking process comprises a user holding or moving another cooking device system of the plurality of cooking device systems.

12. The system of claim 8, wherein the error in the cooking process comprises a user adding the food item to another cooking device system of the plurality of cooking device systems.

13. The system of claim 8, wherein the error in the cooking process comprises a user prematurely positioning the first cooking device system on or in the first heat source or prematurely removing the first cooking device system from the first heat source.

14. The system of claim 8, wherein the error in the cooking process comprises a user holding another cooking device system of the plurality of cooking device systems.

* * * * *